(12) United States Patent
Liu et al.

(10) Patent No.: US 11,742,751 B2
(45) Date of Patent: Aug. 29, 2023

(54) RESONANT SWITCHING POWER CONVERTER

(71) Applicant: Richtek Technology Corporation, Zhubei (TW)

(72) Inventors: Kuo-Chi Liu, Hsinchu (TW); Ta-Yung Yang, Taoyuan (TW); Chung-Lung Pai, Hsinchu (TW)

(73) Assignee: RICHTEK TECHNOLOGY CORPORATION, Zhubei (TW)

( * ) Notice: Subject to any disclaimer, the term of this patent is extended or adjusted under 35 U.S.C. 154(b) by 112 days.

(21) Appl. No.: 17/499,252

(22) Filed: Oct. 12, 2021

(65) Prior Publication Data

US 2022/0140726 A1    May 5, 2022

Related U.S. Application Data

(60) Provisional application No. 63/108,455, filed on Nov. 2, 2020.

(30) Foreign Application Priority Data

Jan. 29, 2021   (TW) .................................. 110103440

(51) Int. Cl.
   *H02M 3/158*   (2006.01)
   *H02M 3/00*    (2006.01)
   *H02M 1/00*    (2006.01)
   *H02M 1/08*    (2006.01)
   *H02M 3/07*    (2006.01)

(52) U.S. Cl.
   CPC ........... *H02M 3/01* (2021.05); *H02M 1/0009* (2021.05); *H02M 1/08* (2013.01); *H02M 3/07* (2013.01); *H02M 3/1584* (2013.01); *H02M 3/1586* (2021.05)

(58) Field of Classification Search
   CPC ........ H02M 3/01; H02M 3/07; H02M 3/1584; H02M 3/1586; H02M 3/158; H02M 1/0095
   See application file for complete search history.

(56) References Cited

U.S. PATENT DOCUMENTS

2021/0359606 A1*  11/2021  Han ................... H02M 1/0054
2022/0115953 A1*   4/2022  Rainer ................ H02M 3/1584

* cited by examiner

*Primary Examiner* — Alex Torres-Rivera
(74) *Attorney, Agent, or Firm* — Tung & Associates

(57) ABSTRACT

A resonant switching power converter includes: a first power stage circuit; a second power stage circuit; a controller; and a current sensing circuit configured to sense a first charging/discharging resonant current flowing through a first charging/discharging inductor of the first power stage circuit and sense a second charging/discharging resonant current flowing through a second charging/discharging inductor of the second power stage circuit, to generate a corresponding first current sensing signal and a corresponding second current sensing signal, respectively. The controller adjusts at least one of a first delay interval, a second delay interval, a third delay interval, a fourth delay interval, and/or input voltages, according to a first current sensing signal and a second current sensing signal, so that a constant ratio between an output current of the first power stage circuit and an output current of the second power stage circuit is achieved.

20 Claims, 18 Drawing Sheets

RESONANT SWITCHING POWER CONVERTER

CROSS REFERENCE

The present invention claims priority to U.S. 63/108,455 filed on Nov. 2, 2020 and claims priority to TW 110103440 filed on Jan. 29, 2021.

BACKGROUND OF THE INVENTION

Field of Invention

The present invention relates to a resonant switching power converter; particularly, it relates to such resonant switching power capable of achieving current balancing control.

Description of Related Art

Please refer to FIG. 1, which shows a schematic diagram of a conventional power converter. Under a charging operation, switches Q1, Q2, Q3 and Q4 are ON, whereas, switches Q5, Q6, Q7, Q8, Q9 and Q10 are OFF, so that a series connection of a capacitor C1, a capacitor C2 and a capacitor C3 is formed between an input voltage Vin and an output voltage Vout. On the other hand, under a discharging operation, switches Q5, Q6, Q7, Q8, Q9 and Q10 are ON, whereas, switches Q1, Q2, Q3 and Q4 are OFF, so that a parallel connection of the capacitor C1, the capacitor C2 and the capacitor C3 is formed between the ground voltage level and the output voltage Vout. The capacitors and switches of such conventional power converter are require to encounter large inrush currents. To solve this problem, in some conventional power converters, an inductor is provided at an appropriate position, to cooperate with one or more of the capacitors to constitute a resonant switching power converter, so as to reduce the inrush current. However, in a case where two or more channels of resonant switching power converters are connected in parallel to work together, because there are infinite possibilities of current combinations, current unbalance very possibly will occur without appropriate control.

In view of the above, to overcome the drawbacks in the prior arts, the present invention proposes an innovated resonant switching power converter capable of ensuring current balance to be achieved in a case where several converters are connected in parallel with one another.

SUMMARY OF THE INVENTION

From one perspective, the present invention provides a resonant switching power converter, which is configured to operably convert one or two input voltages to an output voltage; the resonant switching power converter comprising: a first power stage circuit, including: a plurality of first capacitors; at least one first charging inductor; at least one first discharging inductor; and a plurality of first switches, which are configured to operably switch electrical connection relationships among the plurality of first capacitors, the at least one first charging inductor and the at least one first discharging inductor; a second power stage circuit, including: a plurality of the second capacitors; at least one second charging inductor; at least one second discharging inductor; and a plurality of the second switches, which are configured to operably switch electrical connection relationships among the plurality of second capacitors, the at least one second charging inductor and the at least one second discharging inductor; and a controller, which is configured to periodically operate the plurality of first switches during a first charging process and at least one first discharging process and operate the plurality of the second switches during a second charging process and at least one second discharging process; wherein in the first charging process, the controller is configured to operably control the plurality of first switches, so that a series connection of the plurality of first capacitors and the at least one first charging inductor is formed between the one or two input voltages and the output voltage, which forms a first charging path; wherein in the at least one first discharging process, the controller is configured to operably control the plurality of first switches, so that each first capacitor and a corresponding one of the at least one first discharging inductor are connected in series between the output voltage and a ground voltage level, to form a plurality of first discharging paths concurrently or in a sequential order; wherein in the second charging process, the controller is configured to operably control the plurality of second switches, so that a series connection of the plurality of the second capacitors and the at least one second charging inductor is formed between the one or two input voltages and the output voltage, which forms a second charging path; wherein in the at least one second discharging process, the controller is configured to operably control the plurality of second switches, so that each second capacitor and a corresponding one of the at least one second discharging inductor are connected in series between the output voltage and a ground voltage level, to form a plurality of second discharging paths concurrently or in a sequential order; wherein the controller is further configured to operably adjust at least one of a first delay interval, a second delay interval, a third delay interval, a fourth delay interval, and/or the one or two input voltages, according to a first current sensing signal and a second current sensing signal, so that a constant ratio between an output current of the first power stage circuit and an output current of the second power stage circuit is achieved; wherein the first delay interval is configured to operably delay an initiation time point of the first charging process; wherein the second delay interval is configured to operably delay an initiation time point of the at least one first discharging process; wherein the third delay interval is configured to operably delay an initiation time point of the second charging process; wherein the fourth delay interval is configured to operably delay an initiation time point of the at least one second discharging process; wherein the first current sensing signal is correlated with a first inductor current of the at least one first charging inductor and/or the at least one first discharging inductor, and wherein the second current sensing signal is correlated with a second inductor current of the at least one second charging inductor and/or the at least one second discharging inductor.

In one embodiment, the at least one first charging inductor is one single first charging inductor and the at least one first discharging inductor is one single first discharging inductor, and wherein the at least one second charging inductor is one single second charging inductor and the at least one second discharging inductor is one single second discharging inductor.

In one embodiment, the at least one first charging inductor and the at least one first discharging inductor are one same single first inductor, and wherein the at least one second charging inductor and the at least one second discharging inductor are one same single second inductor.

In one embodiment, the controller includes at least one current sensing circuit, the at least one current sensing circuit including: at least one voltage sensing circuit, which is configured to operably sense a voltage difference across two ends of the at least one first charging inductor and/or the at least one first discharging inductor, so as to generate a corresponding first voltage sensing signal, and the at least one voltage sensing circuit is configured to operably sense a voltage difference across two ends of the at least one second charging inductor and/or the at least one second discharging inductor, so as to generate a corresponding second voltage sensing signal; wherein the first voltage sensing signal is correlated with a voltage across a parasitic resistor of the at least one first charging inductor and/or a voltage across a parasitic resistor of the at least one first discharging inductor, and wherein the second voltage sensing signal is correlated with a voltage across a parasitic resistor of the at least one second charging inductor and/or a voltage across a parasitic resistor of the at least one second discharging inductor; and at least one converter, which is configured to operably generate the first current sensing signal according to the first voltage sensing signal and generate the second current sensing signal according to the second voltage sensing signal.

In one embodiment, the controller further includes: an averaging circuit, which is configured to operably execute an averaging operation on the first current sensing signal and the second current sensing signal, so as to obtain an average of the first current sensing signal and the second current sensing signal, thus generating a current average signal; and at least one adjustment circuit, which is configured to operably compare the current average signal with the first current sensing signal and/or compare the current average signal with the second current sensing signal, so as to generate an delay interval adjustment signal, wherein the delay interval adjustment signal is configured to operably adjust the first delay interval, the second delay interval, the third delay interval, the fourth delay interval or the one or two input voltages, so that the constant ratio between the output current of the first power stage circuit and the output current of the second power stage circuit is achieved.

In one embodiment, the constant ratio between the output current of the first power stage circuit and the output current of the second power stage circuit is 1:1.

In one embodiment, the controller further includes: at least one delay circuit, which is configured to operably generate the first delay interval, the second delay interval, the third delay interval and/or the fourth delay interval according to the delay interval adjustment signal, so that the constant ratio between the output current of the first power stage circuit and the output current of the second power stage circuit is achieved.

In one embodiment, the controller is configured to operably execute at least one of following adjustments so that the constant ratio between the output current of the first power stage circuit and the output current of the second power stage circuit is achieved: when the first current sensing signal is greater than the current average signal, the controller is configured to operably prolong the first delay interval and/or the second delay interval; when the first current sensing signal is smaller than the current average signal, the controller is configured to operably shorten the first delay interval and/or the second delay interval; when the second current sensing signal is greater than the current average signal, the controller is configured to operably prolong the third delay interval and/or the fourth delay interval; and/or when the second current sensing signal is smaller than the current average signal, the controller is configured to operably shorten the third delay interval and/or the fourth delay interval.

In one embodiment, the two input voltages includes a first input voltage corresponding to the first power stage circuit and a second input voltage corresponding to the second power stage circuit, and wherein the controller is configured to operably execute at least one of following adjustments so that the constant ratio between the output current of the first power stage circuit and the output current of the second power stage circuit is achieved: when the first current sensing signal is greater than the current average signal, the controller is configured to operably decrease the first input voltage; when the first current sensing signal is smaller than the current average signal, the controller is configured to operably increase the first input voltage; when the second current sensing signal is greater than the current average signal, the controller is configured to operably decrease the second input voltage; and/or when the second current sensing signal is smaller than the current average signal, the controller is configured to operably increase the second input voltage.

In one embodiment, the first power stage circuit and the second power stage circuit are configured to operate by alternating phases with each other.

In one embodiment, the resonant switching power converter is a bidirectional resonant switching power converter.

In one embodiment, a voltage conversion ratio of the input voltage or input voltages to the output voltage of the resonant switching power converter is adjustable to be 4:1, 3:1 or 2:1.

From another perspective, the present invention provides a resonant switching power converter, which is configured to operably convert one or two input voltages to an output voltage; the resonant switching power converter comprising: a first power stage circuit, including: at least one first resonator, wherein the at least one first resonator includes a first resonant capacitor and a first resonant inductor which are connected in series to each other; at least one first nonresonant capacitor; and a plurality of first switches, which are coupled to the at least one first resonator and the at least one first nonresonant capacitor, wherein the plurality of first switches are configured to operably switch electrical connection relationships between the first resonator and the at least one first nonresonant capacitor, wherein in a first resonant process, a resonant charging operation is performed on the first resonator, and wherein in a second resonant process, a resonant discharging operation is performed on the first resonator, wherein a constant ratio of a voltage across the first resonator to the one or two input voltages is kept; a second power stage circuit, including: at least one second resonator, wherein the at least one second resonator includes a second resonant capacitor and a second resonant inductor which are connected in series to each other; at least one second nonresonant capacitor; and a plurality of the second switches, which are coupled to the at least one second resonator and the at least one second nonresonant capacitor, wherein the plurality of the second switches are configured to operably switch electrical connection relationships between the second resonator and the at least one second nonresonant capacitor, wherein in a third resonant process, a resonant charging operation is performed on the second resonator, and wherein in a fourth resonant process, a resonant discharging operation is performed on the second resonator, wherein a constant ratio of a voltage across the second resonator to the one or two input voltages is kept; a controller, which is configured to periodically operate the plurality of first switches and the plurality of second switches during the first resonant process and the third resonant process, so as to execute the resonant charging operations, and to periodically operate the plurality of first switches and the plurality of second switches during the second resonant process and the fourth resonant process, so as to execute the resonant discharging operations; wherein the controller is further configured to operably adjust at least one of a first delay interval, a second delay interval, a third delay interval, a fourth delay interval, and/or the one or two input voltages according to a first current sensing signal and a second current sensing signal, so that a constant ratio between an output current of the first power stage circuit and an output current of the second power stage circuit is achieved; wherein the first delay interval is configured to operably delay an initiation time point of the first resonant process; wherein the second delay interval is configured to operably delay an initiation time point of the second resonant process; wherein the third delay interval is configured to operably delay an initiation time point of the third resonant process; wherein the fourth delay interval is configured to operably delay an initiation time point of the fourth resonant process; wherein the first current sensing signal is correlated with a first inductor current of the first resonant inductor, and wherein the second current sensing signal is correlated with a second inductor current of the second resonant inductor.

In one embodiment, the controller includes at least one current sensing circuit, the at least one current sensing circuit including: at least one voltage sensing circuit, which is configured to operably sense a voltage difference across two ends of the first resonant inductor, so as to generate a first voltage sensing signal, and to operably sense a voltage difference across two ends of the second resonant inductor, so as to generate a second voltage sensing signal; wherein the first voltage sensing signal is correlated with a voltage across a parasitic resistor of the first resonant inductor, and wherein the second voltage sensing signal is correlated with a voltage across a parasitic resistor of the second resonant inductor; and at least one converter, which is configured to operably generate the first current sensing signal according to the first voltage sensing signal and to operably generate the second current sensing signal according to the second voltage sensing signal.

One advantage of the present invention lies in that: the present invention can achieve current balancing control of a resonant switching power converter having multiple power stage circuits without requiring an additional previous stage voltage regulator.

Another advantage of the present invention lies in that: the present invention can reduce the inrush current without requiring an additional current sensing resistor.

Yet another advantage of the present invention lies in that: the present invention has higher conversion efficiency as compared to conventional power converters.

The objectives, technical details, features, and effects of the present invention will be better understood with regard to the detailed description of the embodiments below, with reference to the attached drawings.

DESCRIPTION OF THE PREFERRED EMBODIMENTS

The drawings as referred to throughout the description of the present invention are for illustration only, to show the interrelations between the circuits and the signal waveforms, but not drawn according to actual scale of circuit sizes and signal amplitudes and frequencies.

Figure 2:
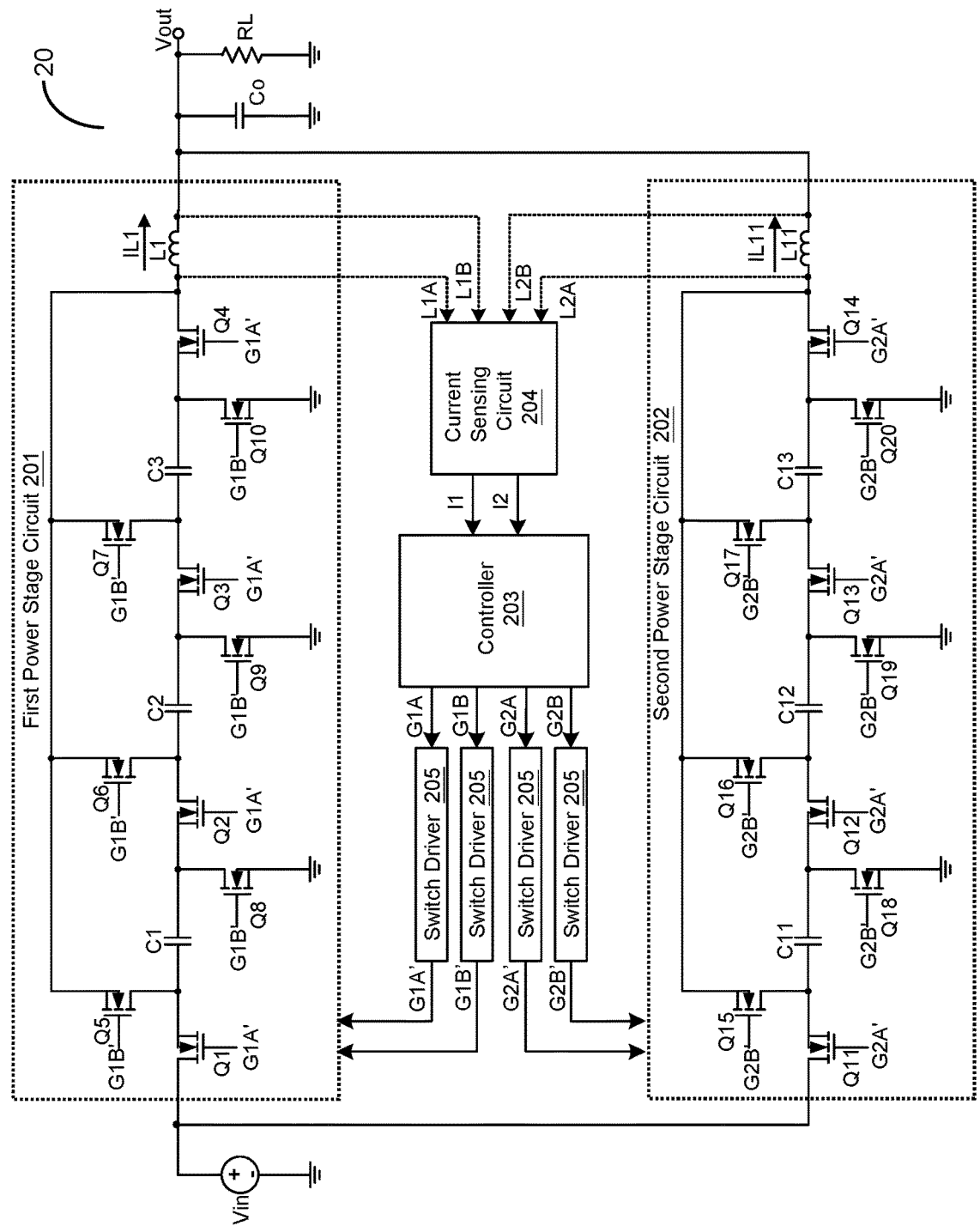
FIG. 2 shows a schematic circuit diagram of a resonant switching power converter according to an embodiment of the present invention.

Please refer to FIG. 2, which shows a schematic circuit diagram of a resonant switching power converter according to an embodiment of the present invention. As shown in FIG. 2, in one embodiment, the resonant switching power converter 20 of the present invention comprises: a first power stage circuit 201 and a second power stage circuit 202. The first power stage circuit 201 and the second power stage circuit 202 are connected in parallel between an input voltage Vin and an output voltage Vout. The first power stage circuit 201 includes: first capacitors C1, C2 and C3, first switches Q1, Q2, Q3, Q4, Q5, Q6, Q7, Q8, Q9 and Q10, and a first inductor L1. The first switches Q1, Q2 and Q3 are connected in series to the corresponding first capacitors C1, C2 and C3, respectively. The first switch Q4 is connected in series to the first inductor L1.

In one embodiment, the second power stage circuit 202 includes: second capacitors C11, C12 and C13, second switches Q11, Q12, Q13, Q14, Q15, Q16, Q17, Q18, Q19 and Q20, and a second inductor L11. The second switches Q11, Q12 and Q13 are connected in series to the corresponding second capacitors C11, C12 and C13, respectively. The second switch Q14 is connected in series to the second inductor L11. It is worthwhile noting that, in the resonant switching power converter 20 of the present invention, the implementation of the number of the first capacitors and the number of the second capacitors as "three" in the above-mentioned preferred embodiment is only an illustrative example, but not for limiting the broadest scope of the present invention. In other embodiments, it is also practicable and within the scope of the present invention that the number of the first capacitors and the number of the second capacitors can be any plural numbers other than three. In one embodiment, each of the first inductor L1 and the second inductor L11 can be a variable inductor.

As shown in FIG. 2, one end of the first switch Q5 is coupled to a node between the first switch Q1 and the first capacitor C1. One end of the first switch Q6 is coupled to a node between the first switch Q2 and the first capacitor C2. One end of the first switch Q7 is coupled to a node between the first switch Q3 and the first capacitor C3. One end of the first switch Q8 is coupled to a node between the first switch Q2 and the first capacitor C1. One end of the first switch Q9 is coupled to a node between the first switch Q3 and the first capacitor C2. One end of the first switch Q10 is coupled to a node between the first switch Q4 and the first capacitor C3. As shown in FIG. 2, the other ends of the first switches Q5-Q7 are commonly electrically connected to a node which is coupled to a node between the first inductor L1 and the first switch Q4. The other ends of the first switches Q8-Q10 are commonly coupled to the ground voltage level. The other end of the first inductor L1 is coupled to the output voltage Vout. The other end of the first switch Q1 is coupled to input voltage Vin. (In the context of the present invention, a switch is regarded as a two-end device; its control terminal is not regarded as an "end".)

Please still refer to FIG. 2. As shown in FIG. 2, one end of the second switch Q15 is coupled to a node between the second switch Q11 and the second capacitor C11. One end of the second switch Q16 is coupled to a node between the second switch Q12 and the second capacitor C12. One end of the second switch Q17 is coupled to a node between the second switch Q13 and the second capacitor C13. One end of the second switch Q18 is coupled to a node between the second switch Q12 and the second capacitor C11. One end of the second switch Q19 is coupled to a node between the second switch Q13 and the second capacitor C12. One end of the second switch Q20 is coupled to a node between the second switch Q14 and the second capacitor C13. As shown in FIG. 2, the other ends of the second switches Q15-Q17 are commonly electrically connected to a node which is coupled to a node between the second inductor L11 and the second switch Q14. The other ends of the second switches Q18-Q20 are commonly coupled to the ground voltage level. The other end of the second inductor L11 is coupled to the output voltage Vout. The other end of the second switch Q11 is coupled to input voltage Vin.

The controller 203 is configured to operably generate a first charging operation signal G1A corresponding to a first charging process and at least one first discharging operation signal G1B corresponding to at least one first discharging process, so as to operate the first switches Q1-Q10, so that the first switches Q1-Q10 are configured to switch electrical connection relationships of the first capacitors C1-C3. Besides, the controller 203 is configured to operably generate a second charging operation signal G2A corresponding to a second charging process and at least one second discharging operation signal G2B corresponding to at least one second discharging process, so as to operate the second switches Q11-Q20, so that the second switches Q11-Q20 are configured to switch electrical connection relationships of the second capacitors C11-C13. Please refer to FIG. 3, which shows a schematic circuit diagram of an embodiment of a controller and an embodiment of a current sensing circuit, which are an embodiment of the controller 203 and an embodiment the current sensing circuit 204 shown in FIG. 2. In one embodiment, the controller 203 further includes a delay circuit 2033a and a delay circuit 2033b. The delay circuit 2033a is configured to operably delay an initiation time point of the first charging process by a first delay interval and/or delay an initiation time point of the at least one first discharging process. The delay circuit 2033b is configured to operably delay an initiation time point of the second charging process by a third delay interval and/or delay an initiation time point of the at least one second discharging process by a fourth delay interval.

Please still refer to FIG. 2. The current sensing circuit 204 is coupled to the first inductor L1 and is coupled to the second inductor L11. The current sensing circuit 204 is configured to operably sense a first charging resonant current flowing through the first inductor L1 during a first charging process and/or a first discharging resonant current flowing through the first inductor L1 during a first discharging process, so as to generate a first current sensing signal I1 accordingly. Besides, the current sensing circuit 204 is configured to operably sense a second charging resonant current flowing through the second inductor L11 during a second charging process and/or a second discharging resonant current flowing through the second inductor L11 during a second discharging process, so as to generate a second current sensing signal I2 accordingly. The controller 203 is coupled to the current sensing circuit 204. The controller 203 is configured to operably adjust at least one of the first delay interval, the second delay interval, the third delay interval and/or the fourth delay interval according to the first current sensing signal I1 and the second current sensing signal I2, so that there is a constant ratio between the output current of the first power stage circuit 201 and the output current of the second power stage circuit 202.

The switch drivers 205 are coupled between the controller 203 and the first switches Q1-Q10, and the switch drivers 205 are coupled between the controller 203 and the second switches Q11-Q2. The switch drivers 205 are configured to operably control the first switches Q1-Q10 according to the first charging operation signal G1A or the first discharging operation signal G1B, and the switch drivers 205 are configured to operably control the second switches Q11-Q20 according to the second charging operation signal G2A or the second discharging operation signal G2B. More specifically, in this embodiment, the switch drivers 205 shown in FIG. 2 are configured to operably generate corresponding driving signals G1A', G1B', G2A' and G2B' according to the first charging operation signal G1A, the first discharging operation signal G1B, the second charging operation signal G2A and the second discharging operation signal G2B, respectively. The driving signal G1A' and the driving signal G1B' are configured to operably drive the corresponding first switches Q1-Q10, whereas, the driving signal G2A' and the driving signal G2B' are configured to operably drive the corresponding second switches Q11-Q20. In one embodiment, the driving signals G1A', G1B', G2A' and G2B' are in phase with the corresponding first charging operation signal G1A, the corresponding first discharging operation signal G1B, the corresponding second charging operation signal G2A and the corresponding second discharging operation signal G2B, respectively.

Please still refer to FIG. 2. The first switches Q1-Q10 are configured to switch electrical connection relationships of the first capacitors C1-C3 with the first inductor L1 according to the first charging operation signal G1A and the first discharging operation signal G1B generated from the controller 203. The second switches Q11-Q20 are configured to switch electrical connection relationships of the first capacitors C11-C13 with the second inductor L11 according to the second charging operation signal G2A and the second discharging operation signal G2B generated from the controller 203. During a first charging process, the controller 203 controls the first switches Q1-Q4 to be ON and controls the first switches Q5-Q10 to be OFF, so that a series connection of the first capacitors C1-C3 and the first inductor L1 is formed between the input voltage Vin and the output voltage Vout, which forms a first charging path. During a first discharging process, the controller 203 controls the first switches Q5-Q10 to be ON and controls the first switches Q1-Q4 to be OFF, so that the first capacitors C1-C3 are connected in parallel, and the parallel circuit formed by the first capacitors C1-C3 is connected in series to the first inductor L1, to form plural first discharging paths.

Likewise, during a second charging process, the controller 203 controls the second switches Q11-Q14 to be ON and controls the second switches Q15-Q20 to be OFF, so that a series connection of the second capacitors C11-C13 and the second inductor L11 is formed between the input voltage Vin and the output voltage Vout, which forms a second charging path. During a second discharging process, the controller 203 controls the second switches Q15-Q20 to be ON and controls the second switches Q11-Q14 to be OFF, so that the second capacitors C11-C13 are connected in parallel, and the parallel circuit formed by the second capacitors C11-C13 is connected in series to the second inductor L11, to form plural second discharging paths.

It is worthwhile mentioning that, in one embodiment, the above-mentioned first charging process and the above-mentioned first discharging process are arranged at different periods in a repeated, alternating manner, wherein the above-mentioned first charging process and the above-mentioned first discharging process are not performed at the same time. Besides, the above-mentioned second charging process and the above-mentioned second discharging process are arranged at different periods in a repeated, alternating manner, wherein the above-mentioned second charging process and the above-mentioned second discharging process are not performed at the same time. To be more specific, in one embodiment, the first charging process and the first discharging process are performed alternatingly and the second charging process and the second discharging process are performed alternatingly, so that the energy supplied from the input voltage Vin charges the capacitors and inductors in a resonant fashion during the above-mentioned charging processes, and the energy stored in the above-mentioned capacitors and inductors is released to the output voltage Vout in a resonant fashion during the above-mentioned discharging processes, thus converting the input voltage Vin to the output voltage Vout. In this embodiment, the DC bias voltages of the first capacitors C1, C2 and C3 and the second capacitors C11, C12 and C13 all have a level of Vo. As a consequence, as compared to the prior art, the first capacitors C1, C2 and C3 and the second capacitors C11, C12 and C13 of the present invention only need to withstand a relatively lower rated voltage, and therefore these capacitors can use capacitors having a smaller size.

In one embodiment, the above-mentioned resonant switching power converter 20 can be a bidirectional resonant switching power converter. As one in this art understands, a "bidirectional" resonant switching power converter have an input terminal (which is coupled to the input voltage Vin) and an output terminal (which is coupled to the output voltage Vout) are interchangeable. That is, in the embodiment shown in FIG. 2, the resonant switching power converter 20 can convert the output voltage Vout to the input voltage Vin. In one embodiment, a voltage conversion ratio of the input voltage Vin to the output voltage Vout of the above-mentioned resonant switching power converter 20 is 4:1, 3:1 or 2:1.

In one embodiment, the voltage conversion ratio of the above-mentioned resonant switching power converter 20 can be flexibly adjusted. For example, in the first charging process and in the first discharging process, by controlling the switch Q7 to be always ON while controlling the switches Q4 and Q10 to be always OFF, the voltage conversion ratio of the first power stage circuit 201 can be adjusted to become 3:1. For another example, in the first charging process and in the first discharging process, by controlling the switch Q6 to be always ON while controlling the switches Q9, Q3, Q7, Q4 and Q10 to be always OFF, the voltage conversion ratio of the first power stage circuit 201 can be adjusted to become 2:1. Similarly, for yet another example, in the second charging process and in the second discharging process, by controlling the switch Q7 to be always ON while controlling the switches Q4 and Q10 to be always OFF, the voltage conversion ratio of the second power stage circuit 202 can be adjusted to become 3:1. Similarly, for still another example, in the second charging process and in the second discharging process, by controlling the switch Q6 to be always ON while controlling the switches Q9, Q3, Q7, Q4 and Q10 to be always OFF, the voltage conversion ratio of the second power stage circuit 202 can be adjusted to become 2:1.

Figure 3:
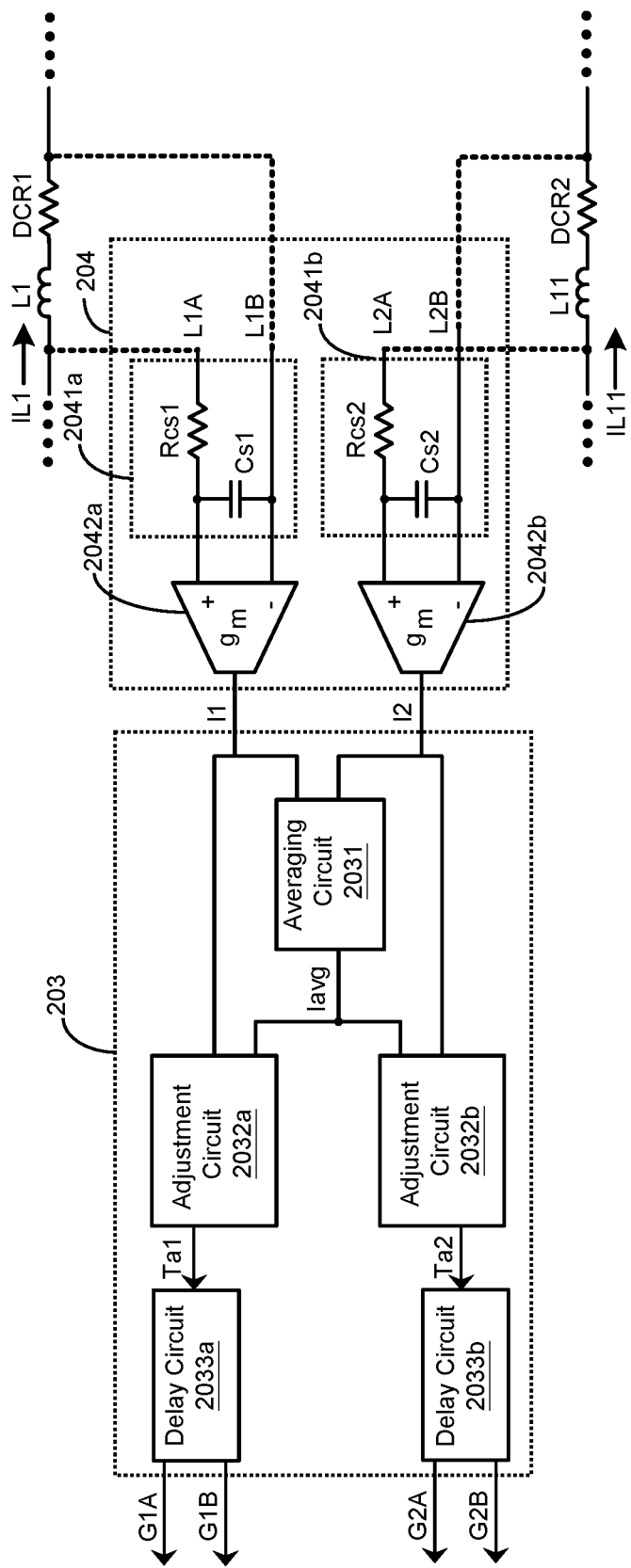
FIG. 3 shows a schematic circuit diagram of a controller of a resonant switching power converter and a current sensing circuit of the resonant switching power converter according to an embodiment of the present invention.

Please still refer to FIG. 3. In one embodiment, the current sensing circuit 204 includes: a voltage sensing circuit 2041a and a voltage sensing circuit 2041b. The voltage sensing circuit 2041a is configured to operably sense a voltage difference (L1A-L1B) across two ends of the first inductor L1, so as to generate a corresponding first voltage sensing signal. The voltage sensing circuit 2041b is configured to operably sense a voltage difference (L2A-L2B) across two ends of the second inductor L11, so as to generate a corresponding second voltage sensing signal. In one embodiment, the voltage sensing circuit 2041a and the voltage sensing circuit 2041b includes: a resistor Rcs1 and a resistor Rcs2, respectively. One end of the resistor Rcs1 is coupled to one end of the first inductor L1, whereas, one end of the resistor Rcs2 is coupled to one end of the second inductor L11. Besides, the voltage sensing circuit 2041a and the voltage sensing circuit 2041b further includes: a capacitor Cs1 and a capacitor Cs2, respectively. One end of the capacitor Cs1 is coupled to the other end of the the first inductor L1, whereas, one end of the capacitor Cs2 is coupled to the other end of the second inductor L11. As one of in this art readily understands, the resistor Rcs1 and the capacitor Cs1 of the voltage sensing circuit 2041a, and the resistor Rcs2 and the capacitor Cs2 of the voltage sensing circuit 2041b form a DCR current detection circuit, which is well known to those skilled in the art, so the details thereof are not redundantly explained here.

The current sensing circuit 204 further includes: a converter 2042a coupled to an output end of the voltage sensing circuit 2041a and a converter 2042b coupled to an output end of the voltage sensing circuit 2041b. The converter 2042a is configured to operably generate the first current sensing signal I1 according to the first voltage sensing signal. The converter 2042b is configured to operably generate the second current sensing signal I2 according to the second voltage sensing signal. In one embodiment, each of the converter 2042a and the converter 2042b can be a transconductance amplifier. Under such implementation, the converter 2042a (i.e., a transconductance amplifier) and the converter 2042b (i.e., another transconductance amplifier) can convert the first voltage sensing signal and the second voltage sensing signal to the corresponding first current sensing signal I1 and the corresponding second current sensing signal I2 according to a transconductance gm (corresponding to the converter 2042a) and another transconductance gm (corresponding to the converter 2042b), respectively. In one embodiment, the first current sensing signal I1 is positively proportional to a corresponding first inductor current IL1, whereas, the second current sensing signal I2 is positively proportional to a corresponding second inductor current IL2.

It should be understood that the implementation of the above-mentioned current sensing circuit 204 as a DCR current detection circuit in the above-mentioned preferred embodiment is only an illustrative example, but not for limiting the broadest scope of the present invention. In other embodiments, it is also practicable and within the scope of the present invention that the above-mentioned current sensing circuit 204 can sense the currents of the first power stage circuit 201 and the second power stage circuit 202 via other current sensing approaches. For example, a current sensing resistor can be provided in a current path, for sensing current. Or, the current can be sensed by sensing a voltage across a switch (e.g., switches Q4, Q7, Q14 and Q17). After current information is achieved, the above-mentioned current balancing control can be achieved.

In one embodiment, the above-mentioned constant ratio can be set as a ratio of 1:1, for current balance. As shown in FIG. 3, in this embodiment, the controller 203 further includes an averaging circuit 2031, which is coupled to the current sensing circuit 204. The averaging circuit 203 is configured to operably execute an averaging operation on the first current sensing signal I1 and the second current sensing signal I2, so as to obtain an average of the first current sensing signal I1 and the second current sensing signal I2, thus generating a current average signal Iavg. In this embodiment, the controller 203 further includes an adjustment circuit 2032a and an adjustment circuit 2032b. The adjustment circuit 2032a is coupled to the averaging circuit 2031 and the current sensing circuit 204. The adjustment circuit 2032b is coupled to the averaging circuit 2031 and the current sensing circuit 204. The adjustment circuit 2032a is configured to operably compare the current average signal Iavg with the first current sensing signal I1, so as to generate a delay interval adjustment signal Ta1, which is inputted to a delay circuit 2033a. The adjustment circuit 2032b is configured to operably compare the current average signal Iavg with the second current sensing signal I2, so as to generate a delay interval adjustment signal Ta2, which is inputted to a delay circuit 2033b. The delay circuit 2033a is configured to operably adjust the above-mentioned first delay interval and second delay interval according to the delay interval adjustment signal Ta1, so as to generate the first charging operation signal G1A and the first discharging operation signal G1B; the delay circuit 2033b is configured to operably adjust the above-mentioned third delay interval and fourth delay interval according to the delay interval adjustment signal Ta2, so as to generate the second charging operation signal G2A and the second discharging operation signal G2B. In this way, the constant ratio between the output current of the first power stage circuit 201 to the output current of the second power stage circuit 202 is achieved.

In one embodiment, when the first current sensing signal I1 is greater than the current average signal Iavg, the controller 203 prolongs the first delay interval and/or the second delay interval; when the first current sensing signal I1 is smaller than the current average signal Iavg, the controller 203 shortens the first delay interval and/or the second delay interval. When the second current sensing signal I2 is greater than the current average signal Iavg, the controller 203 prolongs the third delay interval and/or the fourth delay interval; when the second current sensing signal I2 is smaller than the current average signal Iavg, the controller 203 shortens the third delay interval and/or the fourth delay interval.

Figure 4:
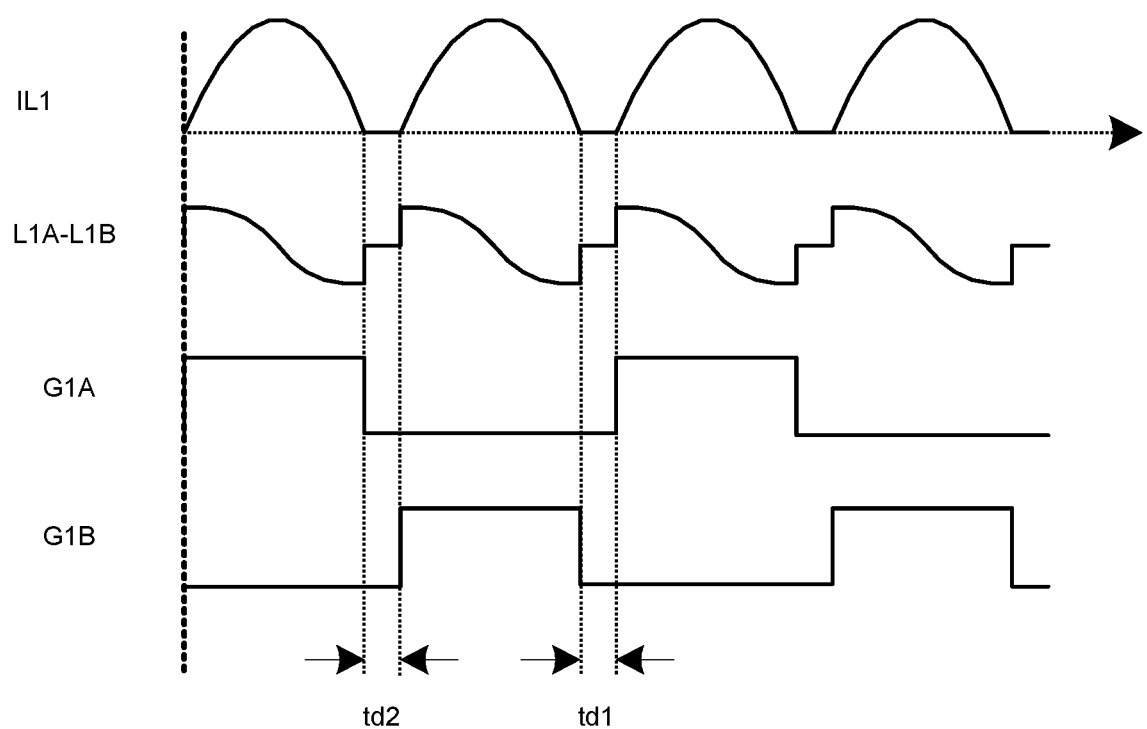
FIG. 4 illustrates a signal waveform diagram of signals pertinent to operation of a first power stage circuit of a resonant switching power converter according to an embodiment of the present invention.

Please refer to FIG. 4, which illustrates a signal waveform diagram of signals related to an operation of the first power stage circuit 201 of the resonant switching power converter 20 according to an embodiment of the present invention. FIG. 4 shows the waveforms of the first inductor current IL1, the voltage difference (i.e., L1A-L1B) across two ends of the first inductor L1, the first charging operation signal G1A and the first discharging operation signal G1B. In FIG. 4, the numerical reference "td1" denotes a first delay interval, whereas, the numerical reference "td2" denotes a second delay interval. In this embodiment, by prolonging the first delay interval td1 and/or the second delay interval td2, the first inductor current IL1 can be decreased; on the other hand, by shortening the first delay interval td1 and/or the second delay interval td2, the first inductor current IL1 can be increased. Thus, a constant ratio of the first inductor current IL1 to a second inductor current IL11 can be achieved, whereby a constant ratio of the output current of the first power stage circuit 201 to the output current of the second power stage circuit 202 is achieved. The second power stage circuit 202 operates in the same way as the first power stage circuit 201, so the details thereof are not redundantly repeated here.

In one embodiment, the constant ratio between the output current of the first power stage circuit 201 and the output current of the second power stage circuit 202 can be achieved by adjusting the delay intervals of both the first power stage circuit 201 and the second power stage circuit 202. In another embodiment, the constant ratio between the output current of the first power stage circuit 201 and the output current of the second power stage circuit 202 can be achieved by simply adjusting one of the delay intervals of the first power stage circuit 201 and the second power stage circuit 202.

Figure 5:
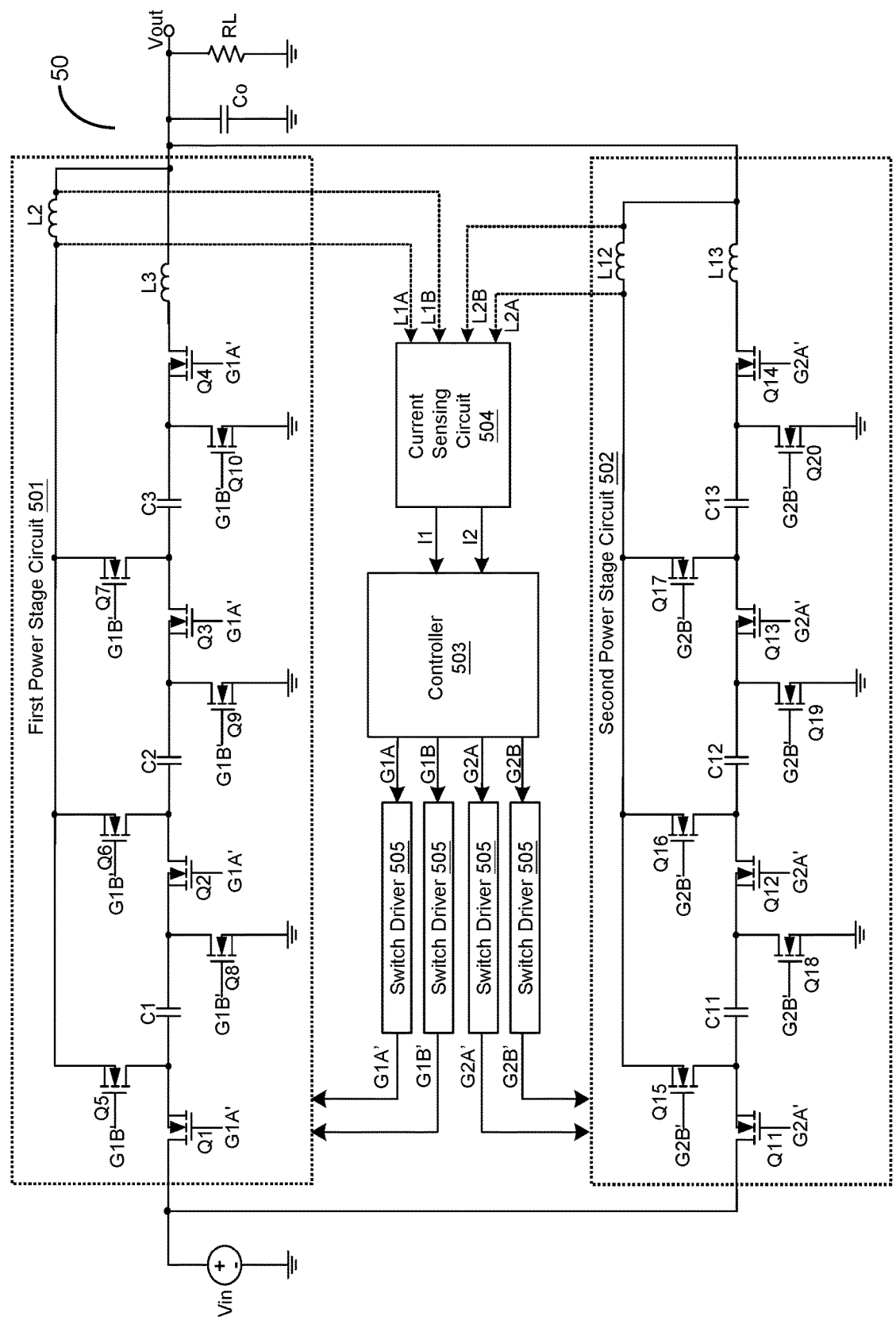
FIG. 5 shows a schematic circuit diagram of a resonant switching power converter according to another embodiment of the present invention.

Please refer to FIG. 5, which shows a schematic circuit diagram of a resonant switching power converter according to another embodiment of the present invention. This embodiment shown in FIG. 5 is similar to the embodiment shown in FIG. 2, but is different in that: in this embodiment shown in FIG. 5, there is a charging inductor at a charging path and a discharging inductor at a discharging path. More specifically, in this embodiment, a first power stage circuit 501 adopts a first charging inductor L3 and a first discharging inductor L2, and a second power stage circuit 502 adopts a second charging inductor L13 and a second discharging inductor L12. The first power stage circuit 501 and the second power stage circuit 502 are connected in parallel between the input voltage Vin and the output voltage Vout.

As shown in FIG. 5, the first power stage circuit 501 of the resonant switching power converter 50 of the present invention includes: first capacitors C1, C2 and C3, first switches Q1, Q2, Q3, Q4, Q5, Q6, Q7, Q8, Q9 and Q10, a first charging inductor L3 and a first discharging inductor L2. The second power stage circuit 502 of the resonant switching power converter 50 of the present invention includes: second capacitors C11, C12 and C13, second switches Q11, Q12, Q13, Q14, Q15, Q16, Q17, Q18, Q19 and Q20 a second charging inductor L13 and a second discharging inductor L12. The first switches Q1, Q2 and Q3 are connected in series to the corresponding first capacitors C1, C2 and C3, respectively. The first switch Q4 is connected in series to the first charging inductor L3. The second switches Q11, Q12 and Q13 are connected in series to the corresponding second capacitors C11, C12 and C13, respectively. The second switch Q14 is connected in series to the second charging inductor L13. It is worthwhile noting that, in the resonant switching power converter 50 of the present invention, the implementation of the number of the first capacitors and the number of the second capacitors as "three" in the above-mentioned preferred embodiment is only an illustrative example, but not for limiting the broadest scope of the present invention. In other embodiments, it is also practicable and within the scope of the present invention that the number of the first capacitors and the number of the second capacitors can be any plural numbers other than three. In one embodiment, the inductance of the first charging inductor L3 is equal to the inductance of the first discharging inductor L2. In another embodiment, an appropriate ratio between the inductance of the first charging inductor L3 and the inductance of the first discharging inductor L2 can be arranged, so that the resonant frequency of the charging process is equal to the resonant frequency of the discharging process. The second power stage circuit 202 operates in the same way as the first power stage circuit 201, so the details thereof are not redundantly repeated here.

As shown in FIG. 5, one end of the first switch Q5 is coupled to a node between the first switch Q1 and the first capacitor C1. One end of the first switch Q6 is coupled to a node between the first switch Q2 and the first capacitor C2. One end of the first switch Q7 is coupled to a node between the first switch Q3 and the first capacitor C3. One end of the first switch Q8 is coupled to a node between the first switch Q2 and the first capacitor C1. One end of the first switch Q9 is coupled to a node between the first switch Q3 and the first capacitor C2. One end of the first switch Q10 is coupled to a node between the first switch Q4 and the first capacitor C3. As shown in FIG. 5, the other ends of the first switches Q5-Q7 are commonly electrically connected to a node which is coupled to one end of the first discharging inductor L2. The other ends of the first switches Q8-Q10 are commonly coupled to the ground voltage level. The other ends of the first charging inductor L3 and the first discharging inductor L2 are coupled to the output voltage Vout. The other end of the first switch Q1 is coupled to input voltage Vin.

Similarly, as shown in FIG. 5, one end of the second switch Q15 is coupled to a node between the second switch Q11 and the second capacitor C11. One end of the second switch Q16 is coupled to a node between the second switch Q12 and the second capacitor C12. One end of the second switch Q17 is coupled to a node between the second switch Q13 and the second capacitor C13. One end of the second switch Q18 is coupled to a node between the second switch Q12 and the second capacitor C11. One end of the second switch Q19 is coupled to a node between the second switch Q13 and the second capacitor C12. One end of the second switch Q20 is coupled to a node between the second switch Q14 and the second capacitor C13. As shown in FIG. 5, the other ends of the second switches Q15-Q17 are commonly electrically connected to a node which is coupled to one end of the second discharging inductor L12. The other ends of the second switches Q18-Q20 are commonly coupled to the ground voltage level. The other ends of the second charging inductor L13 and the second discharging inductor L12 are coupled to the output voltage Vout. The other end of the second switch Q11 is coupled to the input voltage Vin.

The controller 503 is configured to operably generate a first charging operation signal G1A corresponding to a first charging process and at least one first discharging operation signal G1B corresponding to at least one first discharging process, so as to operate the first switches Q1-Q10, so that the first switches Q1-Q10 are configured to switch electrical connection relationships of the first capacitors C1-C3. Besides, the controller 203 is configured to operably generate a second charging operation signal G2A corresponding to a second charging process and at least one second discharging operation signal G2B corresponding to at least one second discharging process, so as to operate the second switches Q11-Q20, so that the second switches Q11-Q20 are configured to switch electrical connection relationships of the second capacitors C11-C13. In one embodiment, the controller 503 can be implemented as the configuration shown in FIG. 3. For example, similar to the implementation shown in FIG. 3, in one embodiment, the controller 503 includes: a delay circuit (e.g. corresponding to the delay circuit 2033a shown in FIG. 3) to operably delay an initiation time point of the first charging process by a first delay interval and/or delay an initiation time point of the at least one first discharging process by a second delay interval, and another delay circuit (corresponding to the delay circuit 2033b shown in FIG. 3) to operably delay an initiation time point of the second charging process by a third delay interval and/or delay an initiation time point of the at least one second discharging process by a fourth delay interval.

Please still refer to FIG. 5. At least one current sensing circuit 504 is coupled to the first discharging inductor L2 and is also coupled to the second discharging inductor L12. The current sensing circuit 504 is configured to operably sense a first discharging resonant current flowing through the first discharging inductor L2 during a first discharging process, so as to generate a corresponding first current sensing signal I1. Besides, the at least one current sensing circuit 504 is configured to operably sense a second discharging resonant current flowing through the second discharging inductor L12 during a second discharging process, so as to generate a corresponding second current sensing signal I2. In another embodiment, the at least one current sensing circuit 504 is coupled to the first charging inductor L3 and is also coupled to the second charging inductor L13, to operably sense a first charging resonant current flowing through the first charging inductor L3 during a first charging process, so as to generate a corresponding first current sensing signal I1, and to operably sense a second charging resonant current flowing through the second charging inductor L13 during a second charging process, so as to generate a corresponding second current sensing signal I2.

The controller 503 is coupled to the current sensing circuit 504. The controller 503 is configured to operably adjust at least one of a first delay interval, a second delay interval, a third delay interval and/or a fourth delay interval according to the first current sensing signal I1 and the second current sensing signal I2, so that a constant ratio between an output current of the first power stage circuit 501 and an output current of the second power stage circuit 502 is achieved. The switch drivers 505 are coupled between the controller 503 and the first switches Q1-Q10, and between the controller 503 and the second switches Q11-Q20. The switch drivers 505 are configured to operably control the first switches Q1-Q10 according to the first charging operation signal G1A or the first discharging operation signal G1B, and the switch drivers 505 are configured to operably control the second switches Q11-Q20 according to the second charging operation signal G2A or the second discharging operation signal G2B. In one embodiment, the current sensing circuit 504 can be implemented as the configuration shown in FIG. 3.

The first switches Q1-Q10 are configured to switch electrical connection relationships of the first capacitors C1-C3 with the first charging inductor L3 and the first discharging inductor L2 according to the first charging operation signal G1A and the first discharging operation signal G1B generated from the controller 503. During a first charging process, the controller 503 controls the first switches Q1-Q4 to be ON and controls the first switches Q5-Q10 to be OFF, so that a series connection of the first capacitors C1-C3 and the first charging inductor L3 is formed between the input voltage Vin and the output voltage Vout, which forms a first charging path. During a first discharging process, the controller 503 controls the first switches Q5-Q10 to be ON and controls the first switches Q1-Q4 to be OFF, so that the first capacitors C1-C3 are connected in parallel, and the parallel circuit formed by the first capacitors C1-C3 is connected in series to the first discharging inductor L2, to form plural first discharging paths.

Similarly, the second switches Q11-Q20 are configured to switch electrical connection relationships of the first capacitors C11-C13 with the second charging inductor L13 and the second discharging inductor L12 according to the second charging operation signal G2A and the second discharging operation signal G2B generated from the controller 503. During a second charging process, the controller 503 controls the second switches Q11-Q14 to be ON and controls the second switches Q15-Q20 to be OFF, so that a series connection of the second capacitors C11-C13 and the second charging inductor L13 is formed between the input voltage Vin and the output voltage Vout, which forms a second charging path. During a second discharging process, the controller 203 controls the second switches Q15-Q20 to be ON and controls the second switches Q11-Q14 to be OFF, so that the second capacitors C11-C13 are connected in parallel, and the parallel circuit formed by the second capacitors C11-C13 is connected in series to the second discharging inductor L12, to form plural second discharging paths.

Figure 6:
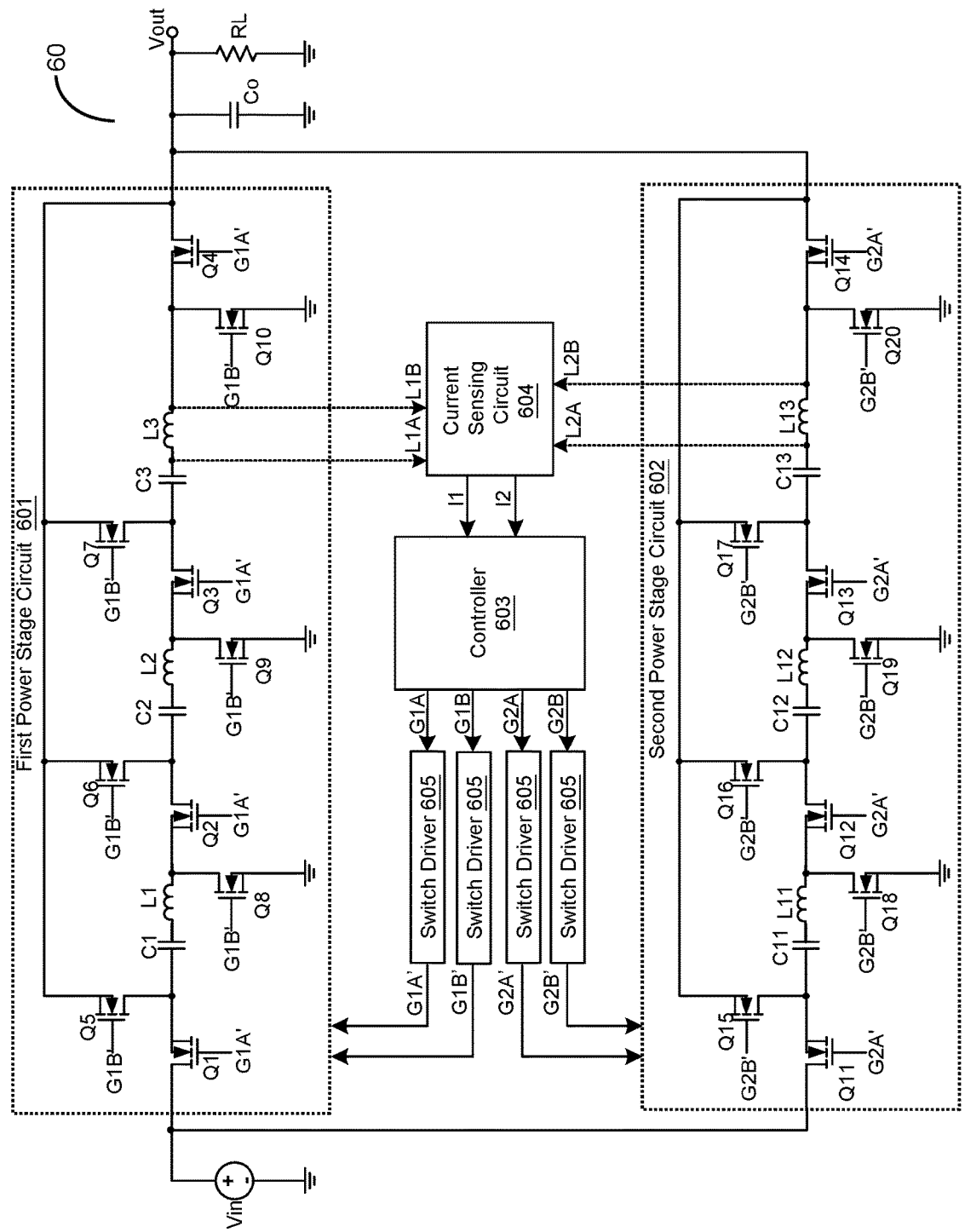
FIG. 6 shows a schematic circuit diagram of a resonant switching power converter according to yet another embodiment of the present invention.

Please refer to FIG. 6, which shows a schematic circuit diagram of a resonant switching power converter according to yet another embodiment of the present invention. As shown in FIG. 6, in one embodiment, the resonant switching power converter 60 of the present invention comprises: a first power stage circuit 601 and a second power stage circuit 602. The first power stage circuit 601 and the second power stage circuit 602 are connected in parallel between an input voltage Vin and an output voltage Vout. The first power stage circuit 601 includes: first capacitors C1, C2 and C3, first switches Q1, Q2, Q3, Q4, Q5, Q6, Q7, Q8, Q9 and Q10 and first inductors L1, L2 and L3. The second power stage circuit 602 includes: second capacitors C11, C12 and C13, second switches Q11, Q12, Q13, Q14, Q15, Q16, Q17, Q18, Q19 and Q20 and a second inductors L11, L12 and L13. The first switches Q1, Q2 and Q3 are connected in series to the corresponding first capacitors C1, C2 and C3, respectively. The first capacitors C1, C2 and C3 are connected in series to the first inductors L1, L2 and L3, respectively. The second switches Q11, Q12, Q13 are connected in series to the corresponding second capacitors C11, C12 and C13, respectively. The second capacitors C11, C12 and C13 are connected in series to the second inductors L11, L12 and L13, respectively. It is worthwhile noting that, in the resonant switching power converter 60 of the present invention, the implementation of the number of the first capacitors and the number of the second capacitors as "three" in the above-mentioned preferred embodiment is only an illustrative example, but not for limiting the broadest scope of the present invention. In other embodiments, it is also practicable and within the scope of the present invention that the number of the first capacitors and second capacitors can be any plural numbers other than three. Likely, the implementation of the number of the inductors as "three" in the above-mentioned preferred embodiment is only an illustrative example, but not for limiting the broadest scope of the present invention. In other embodiments, it is also practicable and within the scope of the present invention that the number of the inductors can be any plural numbers other than three.

As shown in FIG. 6, one end of the first switch Q5 is coupled to a node between the first switch Q1 and the first capacitor C1. One end of the first switch Q6 is coupled to a node between the first switch Q2 and the first capacitor C2. One end of the first switch Q7 is coupled to a node between the first switch Q3 and the first capacitor C3. One end of the first switch Q8 is coupled to a node between the first switch Q2 and the first capacitor C1. One end of the first switch Q9 is coupled to a node between the first switch Q3 and the first capacitor C2. One end of the first switch Q10 is coupled to a node between the first switch Q4 and the first capacitor C3. As shown in FIG. 6, the other ends of the first switches Q5-Q7 are commonly to the output voltage Vout. The other ends of the first switches Q8-Q10 are commonly coupled to the ground voltage level. The first switch Q4 is coupled between the first charging inductor L3 and the output voltage Vout. The other end of the first switch Q1 is coupled to input voltage Vin.

Similarly, as shown in FIG. 6, one end of the second switch Q15 is coupled to a node between the second switch Q11 and the second capacitor C11. One end of the second switch Q16 is coupled to a node between the second switch Q12 and the second capacitor C12. One end of the second switch Q17 is coupled to a node between the second switch Q13 and the second capacitor C13. One end of the second switch Q18 is coupled to a node between the second switch Q12 and the second capacitor C11. One end of the second switch Q19 is coupled to a node between the second switch Q13 and the second capacitor C12. One end of the second switch Q20 is coupled to a node between the second switch Q14 and the second capacitor C13. As shown in FIG. 6, the other ends of the second switches Q15-Q17 are commonly to the output voltage Vout. The other ends of the second switches Q18-Q20 are commonly coupled to the ground voltage level. The second switch Q14 is coupled between the second inductor L13 and the output voltage Vout. The other end of the second switch Q11 is coupled to input voltage Vin.

The controller 603 is configured to operably generate a first charging operation signal G1A corresponding to a first charging process and at least one first discharging operation signal G1B corresponding to at least one first discharging process, so as to operate the first switches Q1-Q10, so that the first switches Q1-Q10 are configured to switch electrical connection relationships of the first capacitors C1-C3. Besides, the controller 603 is configured to operably generate a second charging operation signal G2A corresponding to a second charging process and at least one second discharging operation signal G2B corresponding to at least one second discharging process, so as to operate the second switches Q11-Q20, so that the second switches Q11-Q20 are configured to switch electrical connection relationships of the second capacitors C11-C13. In one embodiment, the controller 603 can be implemented as the configuration shown in FIG. 3. For example, similar to the implementation shown in FIG. 3, in one embodiment, the controller 603 includes: a delay circuit (e.g. corresponding to the delay circuit 2033a shown in FIG. 3) to operably delay an initiation time point of the first charging process by a first delay interval and/or delay an initiation time point of the at least one first discharging process by a second delay interval, and another delay circuit (corresponding to the delay circuit 2033b shown in FIG. 3) to operably delay an initiation time point of the second charging process by a third delay interval and/or delay an initiation time point of the at least one second discharging process by a fourth delay interval.

Please still refer to FIG. 6. The at least one current sensing circuit 604 is coupled to the first inductor L3 and is coupled to the second inductor L13. The at least one current sensing circuit 604 is configured to operably sense a first charging resonant current flowing through the first inductor L3 during a first charging process and/or a first discharging resonant current flowing through the first inductor L3 during a first discharging process, so as to generate a corresponding first current sensing signal I1. Besides, the at least one current sensing circuit 604 is configured to operably sense a second charging resonant current flowing through the second charging inductor L13 during a second charging process and/or a second discharging resonant current flowing through the second discharging inductor L13 during a second discharging process, so as to generate a corresponding second current sensing signal I2. In another embodiment, the at least one current sensing circuit 604 can be coupled to the first inductor L2 and the second inductor L12, to operably sense a first charging resonant current flowing through the first inductor L2 during a first charging process and/or a first discharging resonant current flowing through the first inductor L2 during a first discharging process, so as to generate a corresponding first current sensing signal I1, and to operably sense a second charging resonant current flowing through the second inductor L12 during a second charging process and/or a second discharging resonant current flowing through the second inductor L12 during a second discharging process, so as to generate a corresponding second current sensing signal I2.

In yet another embodiment, the at least one current sensing circuit 604 is coupled to the first inductor L1 and is coupled to the second inductor L11, to operably sense a first charging resonant current flowing through the first inductor L1 during a first charging process and/or a first discharging resonant current flowing through the first inductor L1 during a first discharging process, so as to generate a first current sensing signal I1, and to operably sense a second charging resonant current flowing through the second inductor L11 during a second charging process and/or a second discharging resonant current flowing through the second inductor L11 during a second discharging process, so as to generate a second current sensing signal I2. The controller 603 is coupled to the current sensing circuit 604. The controller 603 is configured to operably adjust at least one of a first delay interval, a second delay interval, a third delay interval and/or a fourth delay interval according to the first current sensing signal I1 and the second current sensing signal I2, so that a constant ratio between an output current of the first power stage circuit 601 and an output current of the second power stage circuit 602 is achieved. The switch drivers 605 are coupled between the controller 603 and the first switches Q1-Q10, and between the controller 603 and the second switches Q11-Q20. The switch drivers 605 are configured to operably control the first switches Q1-Q10 according to the first charging operation signal G1A or the first discharging operation signal G1B, and the switch drivers 605 are configured to operably control the second switches Q11-Q20 according to the second charging operation signal G2A or the second discharging operation signal G2B. In one embodiment, the current sensing circuit 604 can be implemented as the configuration shown in FIG. 3.

The first switches Q1-Q10 are configured to switch electrical connection relationships of the first capacitors C1-C3 with the first inductors L1-L3 according to the first charging operation signal G1A and the first discharging operation signal G1B generated from the controller 603. During a first charging process, the controller 603 controls the first switches Q1-Q4 to be ON and controls the first switches Q5-Q10 to be OFF, so that a series connection of the first capacitors C1-C3 and the first inductors L1-L3 is formed between the input voltage Vin and the output voltage Vout, which forms a first charging path. During a first discharging process, the controller 203 controls the first switches Q5-Q10 to be ON and controls the first switches Q1-Q4 to be OFF, so that the first capacitor C1 and the corresponding first inductor L1 are connected in series between an output voltage Vout and a ground voltage level, and the second capacitor C2 and the corresponding second inductor L2 are connected in series between the output voltage Vout and the ground voltage level, and the third capacitor C3 and the corresponding third inductor L3 are connected in series between the output voltage Vout and the ground voltage level, to form plural first discharging paths.

The second switches Q11-Q20 are configured to switch electrical connection relationships of the first capacitors C11-C13 with the second inductors L11-L13 according to the second charging operation signal G2A and the second discharging operation signal G2B generated from the controller 203. During a second charging process, the controller 603 controls the second switches Q11-Q14 to be ON and controls the second switches Q15-Q20 to be OFF, so that a series connection of the second capacitors C11-C13 and the second inductors L11-L13 is formed between the input voltage Vin and the output voltage Vout, which forms a second charging path. During a second discharging process, the controller 203 controls the second switches Q15-Q20 to be ON and controls the second switches Q11-Q14 to be OFF, so that the second capacitor C11 and the corresponding second inductor L11 are connected in series between an output voltage Vout and a ground voltage level, and the second capacitor C12 and the corresponding second inductor L12 are connected in series between the output voltage Vout and the ground voltage level, and the third capacitor C13 and the corresponding third inductor L13 are connected in series between the output voltage Vout and the ground voltage level, to form plural second discharging paths.

Figure 7:
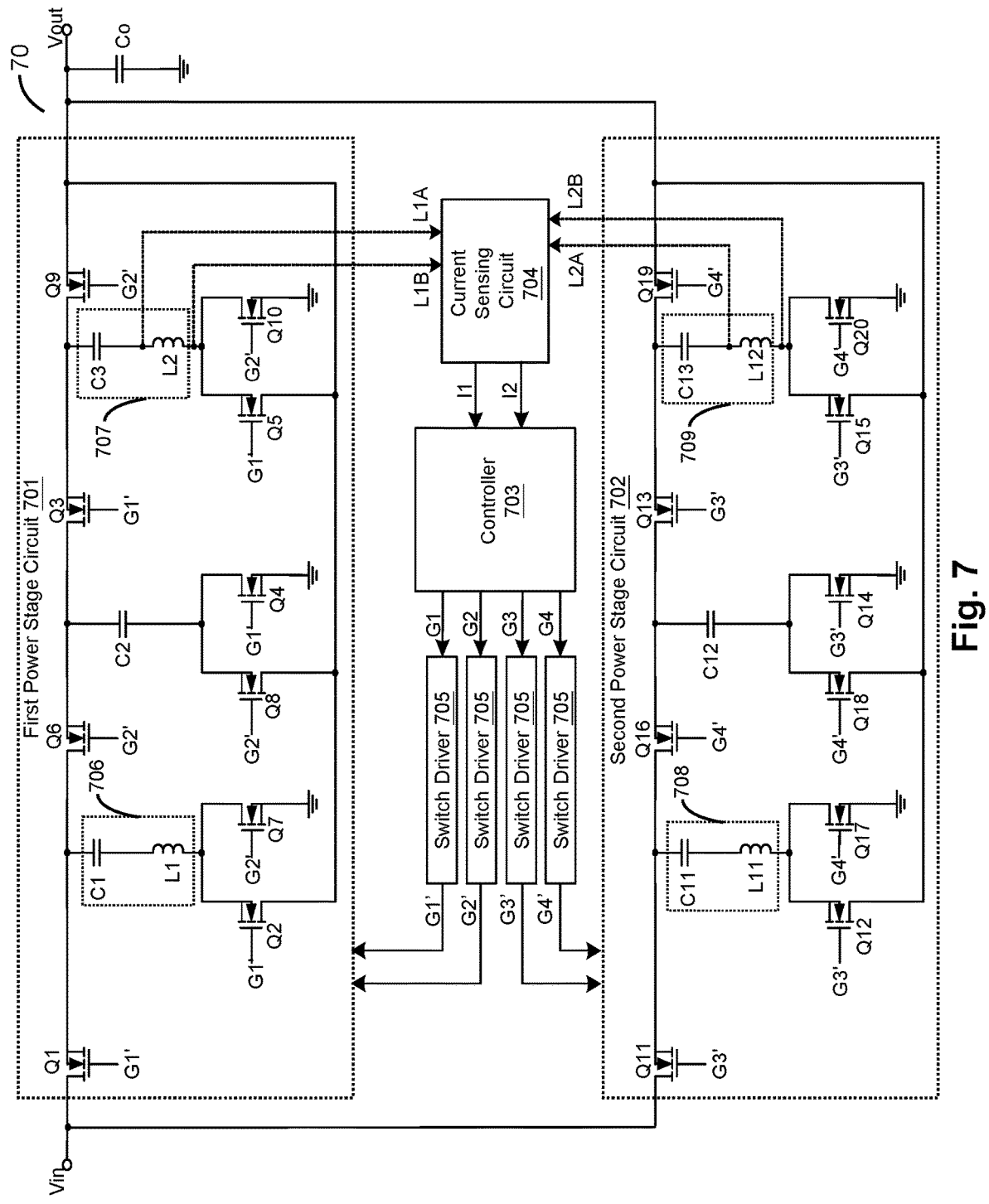
FIG. 7 shows a schematic circuit diagram of a resonant switching power converter according to still another embodiment of the present invention.

Please refer to FIG. 7, which shows a schematic circuit diagram of a resonant switching power converter according to still another embodiment of the present invention. As shown in FIG. 7, in one embodiment, the resonant switching power converter 70 of the present invention comprises: a first power stage circuit 701 and a second power stage circuit 702. The first power stage circuit 701 and the second power stage circuit 702 are connected in parallel between an input voltage Vin and an output voltage Vout. The first power stage circuit 701 includes: first resonant capacitors C1 and C3, at least one first nonresonant capacitor C2, first switches Q1, Q2, Q3, Q4, Q5, Q6, Q7, Q8, Q9 and Q10 and first nonresonant inductors L1 and L2. The second power stage circuit 702 includes: second resonant capacitors C11 and C13, at least one second nonresonant capacitor C12, second switches Q11, Q12, Q13, Q14, Q15, Q16, Q17, Q18, Q19 and Q20 and second nonresonant inductors L11 and L12.

As shown in FIG. 7, in one embodiment, the controller 703 is configured to operably generate a first resonant operation signal G1A corresponding to a first resonant process and a second resonant operation signal G2 corresponding to a second resonant process, so as to operate the first switches Q1-Q10, so that the first switches Q1-Q10 are configured to switch electrical connection relationships of the corresponding first resonant capacitors C1 and C3 and the corresponding first nonresonant capacitor C2. Besides, the controller 703 is configured to operably generate a third resonant operation signal G3 corresponding to a third resonant process and a fourth resonant operation signal G4 corresponding to a fourth resonant process, so as to operate the second switches Q11-Q20, so that the second switches Q11-Q20 are configured to switch electrical connection relationships of the corresponding second resonant capacitors C11 and C13 and the corresponding second nonresonant capacitor C12.

The resonant switching power converter 70 comprises at least one first resonator such as a first resonator 706 and a first resonator 707. The first resonator 706 includes a first resonant capacitor C1 and a first resonant inductor L1 which are connected in series to each other. The first resonator 707 includes a first resonant capacitor C3 and a first resonant inductor L2 which are connected in series to each other. The resonant switching power converter 70 further comprises at least one second resonator such as a second resonator 708 and a second resonator 709. The second resonator 708 includes a second resonant capacitor C11 and a second resonant inductor L11 which are connected in series to each other. The second resonator 709 includes a second resonant capacitor C13 and a second resonant inductor L12 which are connected in series to each other. In one embodiment, the controller 703 can be implemented as the configuration shown in FIG. 3. The controller 703 can include: a delay circuit (e.g. corresponding to the delay circuit 2033a shown in FIG. 3) to operably delay an initiation time point of the first charging process by a first delay interval and/or delay an initiation time point of the at least one first discharging process by a second delay interval, and another delay circuit (corresponding to the delay circuit 2033b shown in FIG. 3) to operably delay an initiation time point of the second charging process by a third delay interval and/or delay an initiation time point of the at least one second discharging process by a fourth delay interval.

Please still refer to FIG. 7. At least one current sensing circuit 704 is coupled to the first resonant inductor L2 and the second resonant inductor L12, and is configured to operably sense a first resonant current flowing through the first resonant inductor L2 during a first resonant process and/or a second resonant current flowing through the first resonant inductor L2 during a second resonant process, so as to generate a first current sensing signal I1. Besides, the current sensing circuit 704 is configured to operably sense a third resonant current flowing through the second resonant inductor L12 during a third resonant process and/or a fourth resonant current flowing through the second resonant inductor L12 during a fourth resonant process, so as to generate a second current sensing signal I2. In another embodiment, the current sensing circuit 704 is coupled to the first resonant inductor L1 and the second resonant inductor L11, and is configured to operably sense a first resonant current flowing through the first resonant inductor L1 during a first resonant process and/or a second resonant current flowing through the first resonant inductor L1 during a second resonant process, so as to generate a first current sensing signal I1. Besides, the current sensing circuit 704 is configured to operably sense a third resonant current flowing through the second resonant inductor L11 during a third resonant process and/or a fourth resonant current flowing through the second resonant inductor L11 during a fourth resonant process, so as to generate a second current sensing signal I2.

The controller 703 is coupled to the current sensing circuit 704. The controller 703 is configured to operably adjust at least one of a first delay interval, a second delay interval, a third delay interval and/or a fourth delay interval according to the first current sensing signal I1 and the second current sensing signal I2, so that a constant ratio between an output current of the first power stage circuit 701 and an output current of the second power stage circuit 702 is achieved. The switch drivers 705 are coupled between the controller 703 and the first switches Q1-Q10, and between between the controller 703 and the second switches Q11-Q20. The switch drivers 705 are configured to operably control the first switches Q1-Q10 according to the first resonant operation signal G1 or the first resonant operation signal G2, and to operably control the second switches Q11-Q20 according to the third resonant operation signal G3 or the fourth resonant operation signal G4.

More specifically, in this embodiment, the switch drivers 705 shown in FIG. 7 are configured to operably generate a corresponding driving signal G1', a corresponding driving signal G2', a corresponding driving signal G3' and a corresponding driving signal G4' according to the first resonant operation signal G1, the second resonant operation signal G2, the third resonant operation signal G3, the fourth resonant operation signal G4, respectively. The driving signal G1' and the driving signal G2' are configured to operably drive the first switches Q1-Q10, whereas, the driving signal G3' and the driving signal G4' are configured to operably drive the second switches Q11-Q20. In one embodiment, the driving signal G1', the driving signal G2', the driving signal G3' and the driving signal G4' are in phase with the first resonant operation signal G1, the second resonant operation signal G2, the third resonant operation signal G3, and the fourth resonant operation signal G4, respectively.

In one embodiment, the current sensing circuit 704 can be implemented as the configuration shown in FIG. 3. The first resonant operation signal G1, the second resonant operation signal G2, the third resonant operation signal G3, the fourth resonant operation signal G4 correspond to the first charging operation signal G1A, the first discharging operation signal G1B, the second charging operation signal G2A and the second discharging operation signal G2B, respectively. The driving signal G1', the driving signal G2', the driving signal G3' and the driving signal G4' correspond to the driving signal G1A', the driving signal G1B', the driving signal G2A' and the driving signal G2B' shown in FIG. 2, respectively.

The first switches Q1-Q10 are coupled to a first resonator 706 and a first resonator 707. The first switches Q1-Q10 are configured to operably switch electrical connection relationships of the corresponding first resonator 706 and the corresponding first resonator 707 according to the first resonant operation signal G1 and the second resonant operation signal G2, so as to correspondingly execure a first resonant process and a second resonant process. The second switches Q11-Q20 are coupled to a second resonator 708 and a second resonator 709. The second switches Q11-Q20 are configured to operably switch electrical connection relationships of the corresponding second resonator 708 and the corresponding second resonator 709 according to the third resonant operation signal G3 and the fourth resonant operation signal G4, so as to correspondingly execure a third resonant process and a fourth resonant process. In the first resonant process, a resonant charging operation is performed on the first resonators 706 and 707. In the second resonant process, a resonant discharging operation is performed on the first resonators 706 and 707. In a third resonant process, a resonant charging operation is performed on the second resonators 708 and 709. In a fourth resonant process, a resonant discharging operation is performed on the second resonators 708 and 709.

At least one first nonresonant capacitor C2 is coupled to the first resonators 706 and 707. The first resonant operation signal G1 and the second resonant operation signal G2 are configured to operably switch electrical connection relationships between the corresponding first resonators 706 and 707 and the first nonresonant capacitor C2. At least one second nonresonant capacitor C12 is coupled to the second resonators 708 and 709. The third resonant operation signal G3 and the fourth resonant operation signal G4 are configured to operably switch electrical connection relationships between the corresponding second resonators 708 and 709 and the second nonresonant capacitor C12. A constant ratio of the voltages across the first resonators 706 and 707 to the input voltage Vin is kept. For example, the constant ratio of each voltage across the first resonators 706 and 707 to the input voltage Vin is 1:2.

The first resonant process and the second resonant process are arranged in a repeated, alternating manner and the third resonant process and the fourth resonant process are arranged in a repeated, alternating manner, so as to convert the input voltage Vin to the output voltage Vout. In one embodiment, the first resonant operation signal G1 and the second resonant operation signal G2 have ON periods which do not overlap with each other, whereby the first resonant process and the second resonant process do not overlap to each other. Besides, in one embodiment, the third resonant operation signal G3 and the fourth resonant operation signal G4 have ON periods which do not overlap with each other, whereby the third resonant process and the fourth resonant process do not overlap with each other During a first resonant process, the controller 703 controls the first switches Q1, Q3, Q5, Q8 and Q9 to be ON and controls the first switches Q2, Q4, Q6, Q7 and Q10 to be OFF according to the first resonant operation signal G1, so that the first resonant capacitor C1 and the first resonant inductor L1 of the first resonator 706 are connected in series between the input voltage Vin and the output voltage Vout and so that the first nonresonant capacitor C2, and the first resonant capacitor C3 and the first resonant inductor L2 of the first resonator 707, are connected in series between the ground voltage level and the output voltage Vout. As a result, a charging operation is performed on the first resonant capacitor C1 and the first resonant capacitor C3, whereas, a discharging operation is performed on the first nonresonant capacitor C2. During a second resonant process, the controller 703 controls the first switches Q2, Q4, Q6, Q7 and Q10 to be ON and controls the first switches Q1, Q3, Q5, Q8 and Q9 to be OFF according to the second resonant operation signal G2, so that the first nonresonant capacitor C2, and the first resonant capacitor C1 and the first resonant inductor L1 of the first resonator 706, are connected in series between the ground voltage level and the output voltage Vout, and so that the first nonresonant capacitor C2, and the first resonant capacitor C3 and the first resonant inductor L2 of the first resonator 707, are connected in series between the ground voltage level and the output voltage Vout. As a result, a discharging operation is performed on the first resonant capacitor C1 and the first resonant capacitor C3, whereas, a charging operation is performed on the first nonresonant capacitor C2.

During a third resonant process, the controller 703 controls the second switches Q11, Q13, Q15, Q18 and Q19 to be ON and controls the second switches Q12, Q14, Q16, Q17 and Q20 to be OFF according to the third resonant operation signal G3, so that the second resonant capacitor C11 and the second resonant inductor L11 of the second resonator 708 are connected in series between the input voltage Vin and the output voltage Vout, and so that the second nonresonant capacitor C12, and the second resonant capacitor C13 and the second resonant inductor L12 of the second resonator 709, are connected in series between the ground voltage level and the output voltage Vout. As a result, a charging operation is performed on the second resonant capacitor C11 and the second resonant capacitor C13, whereas, a discharging operation is performed on the second nonresonant capacitor C12. During a fourth resonant process, the controller 703 controls the second switches Q12, Q14, Q16, Q17 and Q20 to be ON and controls the second switches Q11, Q13, Q15, Q18 and Q19 to be OFF according to the fourth resonant operation signal G4, so that the second nonresonant capacitor C12, and the second resonant capacitor C11 and the second resonant inductor L11 of the second resonator 708, are connected in series between the ground voltage level and the output voltage Vout, and so that the second nonresonant capacitor C12, and the second resonant capacitor C13 and the second resonant inductor L12 of the second resonator 709, are connected in series between the ground voltage level and the output voltage Vout. As a result, a discharging operation is performed on the second resonant capacitor C11 and the second resonant capacitor C13, whereas, a charging operation is performed on the second nonresonant capacitor C12.

The operation mechanism of resonant operations performed by the first resonators 706 and 707 and the second resonators 708 and 709 of the resonant switching power converter 70 shown in FIG. 7 is well known to those skilled in the art, so the details thereof are not redundantly explained here.

Figure 8:
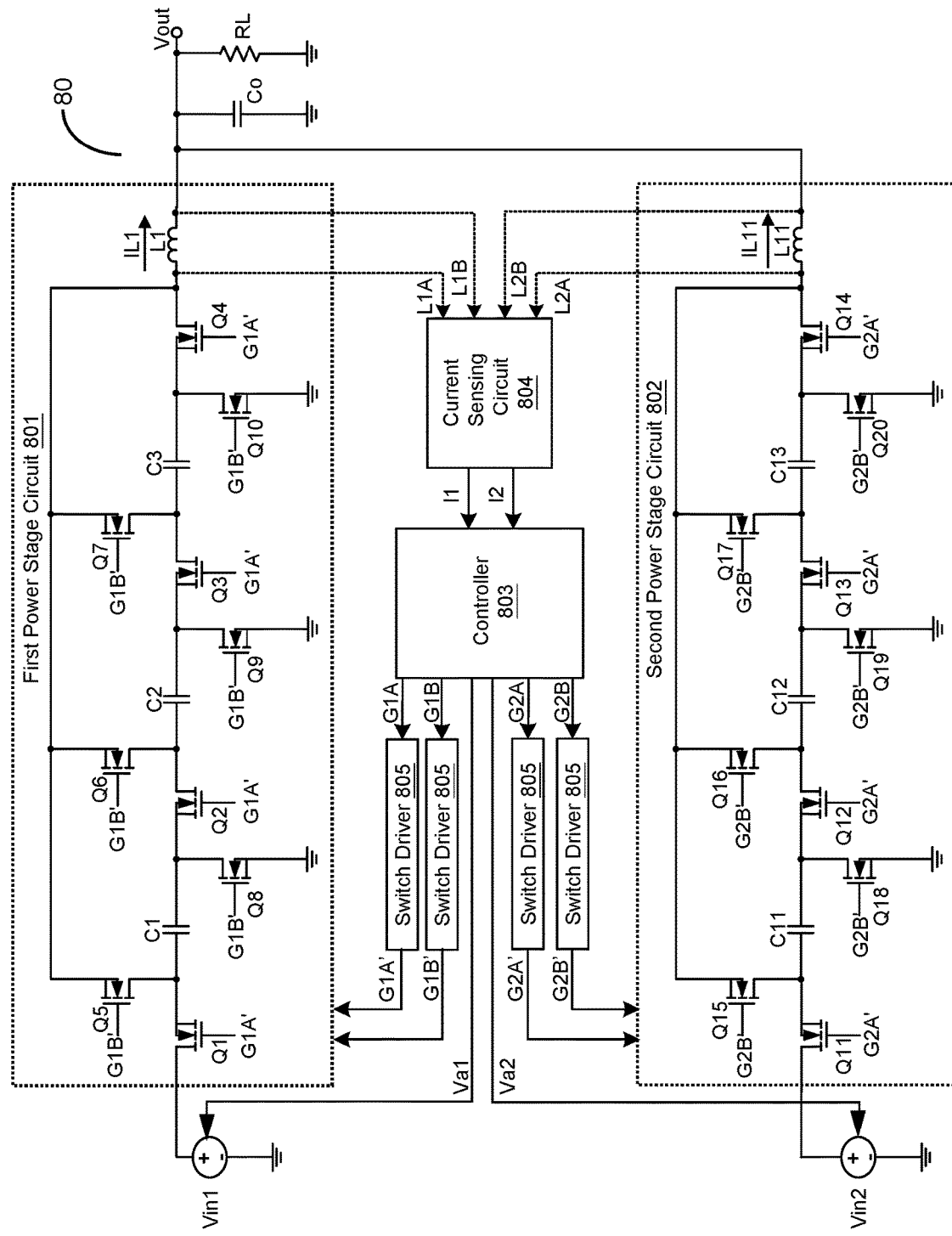
FIG. 8 shows a schematic circuit diagram of a resonant switching power converter according to still another embodiment of the present invention.

Please refer to FIG. 8 which shows a schematic circuit diagram of a resonant switching power converter according to still another embodiment of the present invention. This embodiment shown in FIG. 8 is similar to the embodiment shown in FIG. 2, but is different in that: this embodiment shown in FIG. 8 adopts two input voltages. For example, in this embodiment shown in FIG. 8, a first power stage circuit and a second power stage circuit respectively convert an input voltage Vin1 and an input voltage Vin2 to an output voltage Vout. In contrast, the embodiment shown in FIG. 2 simply adopts one single input voltage. In one embodiment, the resonant switching power converter 80 can be implemented as an interleaving type power converter shown in FIG. 8. That is, when the first power stage circuit 801 of the resonant switching power converter 80 is in a first charging process, the second power stage circuit 802 of the resonant switching power converter 80 is executing a second discharging process. Likewise, when the first power stage circuit 801 of the resonant switching power converter 80 is in a first discharging process, the second power stage circuit 802 of the resonant switching power converter 80 is executing a second charging process. In other words, when the first switches Q1-Q4 are enabled by the first charging operation signal G1A generated from the controller 803, the second switches Q15-Q20 are enabled by the second discharging operation signal G2B generated from the controller 803. When the first switches Q5-Q10 are enabled by the first discharging operation signal G1B generated from the controller 803, the second switches Q15-Q20 are enabled by the second charging operation signal G2A generated from the controller 803.

The first switches Q1-Q10, the first first capacitors C1-C3, the first inductor L1, the second switches Q11-Q20, the second second capacitors C11-C13, the second inductor L11, the current sensing circuit 804 and the switch drivers 805 of this embodiment shown in FIG. 8 are similar to the first switches Q1-Q10, the first first capacitors C1-C3, the first inductor L1, the second switches Q11-Q20, the second second capacitors C11-C13, the second inductor L11, the current sensing circuit 204 and the switch drivers 205 of the embodiment shown in FIG. 2, so the details thereof are not redundantly repeated here. The controller 803 is configured to operably generate a first charging operation signal G1A corresponding to a first charging process and at least one first discharging operation signal G1B corresponding to at least one first discharging process, so as to operate the first switches Q1-Q10, so that the first switches Q1-Q10 switch electrical connection relationships of the first capacitors C1-C3. Besides, the controller 803 is configured to operably generate a second charging operation signal G2A corresponding to a second charging process and at least one second discharging operation signal G2B corresponding to at least one second discharging process, so as to operate the second switches Q11-Q20, so that the second switches Q11-Q20 switch electrical connection relationships of the second capacitors C11-C13. Moreover, the controller 803 is further configured to operably generate an input voltage delay interval adjustment signal Va1 and an input voltage delay interval adjustment signal Va2, so as to respectively adjust the input voltage Vin1 and the input voltage Vin2. The controller 803 is coupled to the current sensing circuit 804. The current sensing circuit 804 is configured to operably adjust at least one of the input voltage Vin1 and the input voltage Vin2 according to the first current sensing signal I1 and the second current sensing signal I2, so that a constant ratio between an output current of the first power stage circuit 801 and an output current of the second power stage circuit 802 is achieved.

Figure 9:
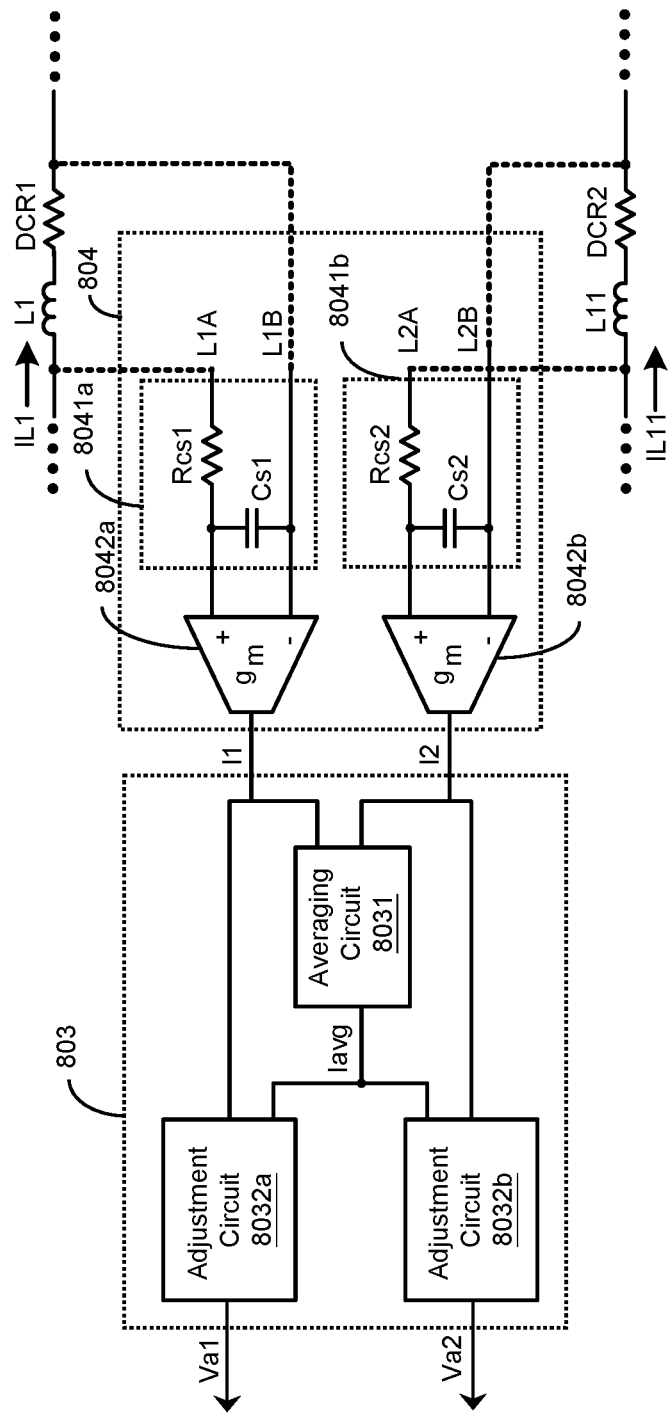
FIG. 9 shows a schematic circuit diagram of a controller of a resonant switching power converter and a current sensing circuit of the resonant switching power converter according to an embodiment of the present invention.

Please refer to FIG. 9, which shows a schematic circuit diagram of an embodiment of a controller and an embodiment of a current sensing circuit. To be more specific, FIG. 9 shows an embodiment of the controller 803 and an embodiment of the current sensing circuit 804 shown in FIG. 8. The averaging circuit 8031, the voltage sensing circuit 8041a, the voltage sensing circuit 8041b, the resistor Rcs1, the resistor Rcs2, the converter 8042a and the converter 8042b of this embodiment shown in FIG. 9 operate in the same way as the averaging circuit 2031, the voltage sensing circuit 2041a, the voltage sensing circuit 2041b, the resistor Rcs1, the resistor Rcs2, the converter 2042a and the converter 2042b of the embodiment shown in FIG. 3, so the details thereof are not redundantly repeated here. This embodiment shown in FIG. 9 is different from the embodiment shown in FIG. 3, in that: in the controller 803 of this embodiment, the adjustment circuit 8032a is coupled to the averaging circuit 8031 and the current sensing circuit 804, and the adjustment circuit 8032b is coupled to the averaging circuit 8031 and the at least one current sensing circuit 804. The adjustment circuit 8032a is configured to operably compare the current average signal Iavg with the first current sensing signal I1, so as to generate an input voltage adjustment signal Va1, which is transmitted to adjust the input voltage Vin1. The adjustment circuit 8032b is configured to operably compare the current average signal Iavg with the second current sensing signal I2, so as to generate an input voltage adjustment signal Va2, which is transmitted to adjust the input voltage Vin2.

In one embodiment, the input voltage Vin1 and the input voltage Vin2 are increased or decreased according to the input voltage adjustment signal Va1 and the input voltage adjustment signal Va2, respectively, so that a constant ratio between an output current of the first power stage circuit 801 and an output current of the second power stage circuit 802 is achieved. Because the output power is increased as the input voltage is increased, the output current of the corresponding power stage circuit can be accordingly increased. More specifically, in one embodiment, the controller 1303 is configured to execute at least one of following adjustments such that a constant ratio between an output current of the first power stage circuit 801 and an output current of the second power stage circuit 802 can be achieved: when the first current sensing signal I1 is greater than the current average signal Iavg, the controller 1303 is configured to operably decrease the input voltage Vin; when the first current sensing signal I1 is smaller than the current average signal Iavg, the controller 1303 is configured to operably increase the input voltage Vin; when the second current sensing signal I2 is greater than the current average signal Iavg, the controller 1303 is configured to operably decrease the input voltage Vin2; when the second current sensing signal I2 is smaller than the current average signal Iavg, the controller 1303 is configured to operably increase the input voltage Vin2.

Figure 10:
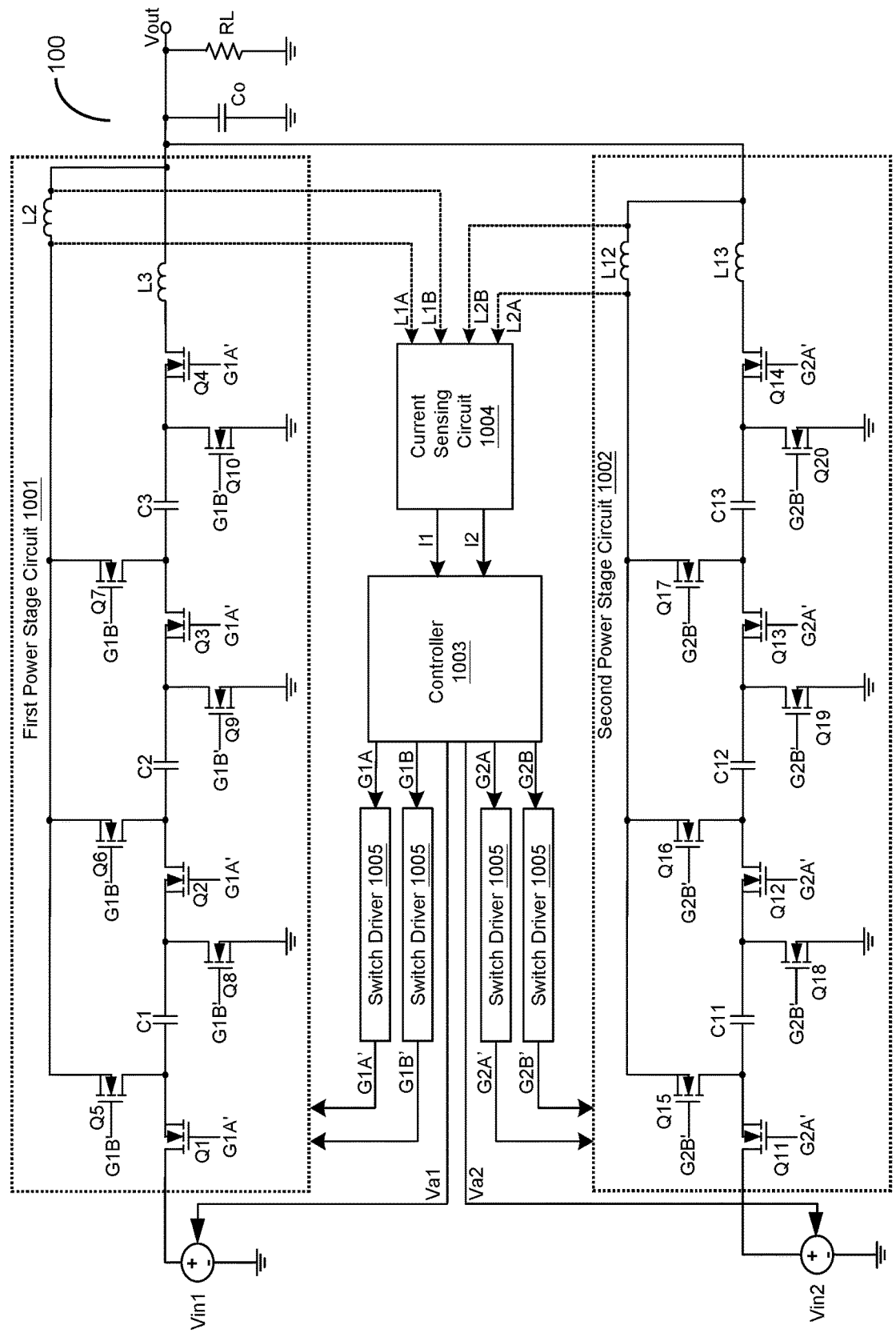
FIG. 10 shows a schematic circuit diagram of a resonant switching power converter according to still another embodiment of the present invention.

Please refer to FIG. 10, which shows a schematic circuit diagram of a resonant switching power converter according to still another embodiment of the present invention. This embodiment shown in FIG. 10 is similar to the embodiment shown in FIG. 5, but is different in that: this embodiment shown in FIG. 10 adopts two input voltages. For example, in this embodiment shown in FIG. 10, a first power stage circuit and a second power stage circuit respectively convert an input voltage Vin1 and an input voltage Vin2 to an output voltage Vout. In contrast, the embodiment shown in FIG. 5 simply adopts one single input voltage. In one embodiment, the resonant switching power converter 100 can be implemented as an interleaving type power converter shown in FIG. 10. That is, when the first power stage circuit 1001 of the resonant switching power converter 100 is in a first charging process, the second power stage circuit 1002 of the resonant switching power converter 100 is executing a second discharging process. Likewise, when the first power stage circuit 1001 of the resonant switching power converter 100 is in a first discharging process, the second power stage circuit 802 of the resonant switching power converter 80 is executing a second charging process. In other words, when the first switches Q1-Q4 are enabled by the first charging operation signal G1A generated from the controller 1003, the second switches Q15-Q20 are enabled by the second discharging operation signal G2B generated from the controller 1003. When the first switches Q5-Q10 are enabled by the first discharging operation signal G1B generated from the controller 1003, the second switches Q15-Q20 are enabled by the second charging operation signal G2A generated from the controller 1003.

The first switches Q1-Q10, the first first capacitors C1-C3, the first charging inductor L3, the first discharging inductor L2, the second switches Q11-Q20, the second second capacitors C11-C13, the second charging inductor L13, the second discharging inductor L12, the current sensing circuit 1004 and the switch drivers 1005 of this embodiment shown in FIG. 10 are similar to the first switches Q1-Q10, the first first capacitors C1-C3, the first charging inductor L3, the first discharging inductor L2, the second switches Q11-Q20, the second second capacitors C11-C13, the second charging inductor L13, the second discharging inductor L12, the current sensing circuit 504 and the switch drivers 505 of the embodiment shown in FIG. 5, so the details thereof are not redundantly repeated here. The controller 1003 is configured to operably generate a first charging operation signal G1A corresponding to a first charging process and at least one first discharging operation signal G1B corresponding to at least one first discharging process, so as to operate the first switches Q1-Q10, so that the first switches Q1-Q10 switch electrical connection relationships of the first capacitors C1-C3. Besides, the controller 1003 is configured to operably generate a second charging operation signal G2A corresponding to a second charging process and at least one second discharging operation signal G2B corresponding to at least one second discharging process, so as to operate the second switches Q11-Q20, so that the second switches Q11-Q20 switch electrical connection relationships of the second capacitors C11-C13. Moreover, the controller 1003 is further configured to operably generate an input voltage delay interval adjustment signal Va1 and an input voltage delay interval adjustment signal Va2, so as to respectively adjust the input voltage Vin1 and the input voltage Vin2. The controller 1003 is coupled to the current sensing circuit 1004. The current sensing circuit 1004 is configured to operably adjust at least one of the input voltage Vin1 and the input voltage Vin2 according to the first current sensing signal I1 and the second current sensing signal I2, so that a constant ratio between an output current of the first power stage circuit 1001 and an output current of the second power stage circuit 1002 is achieved. In one embodiment, the controller 1003 and the current sensing circuit 1004 can be implemented as the configuration shown in FIG. 9.

Figure 11:
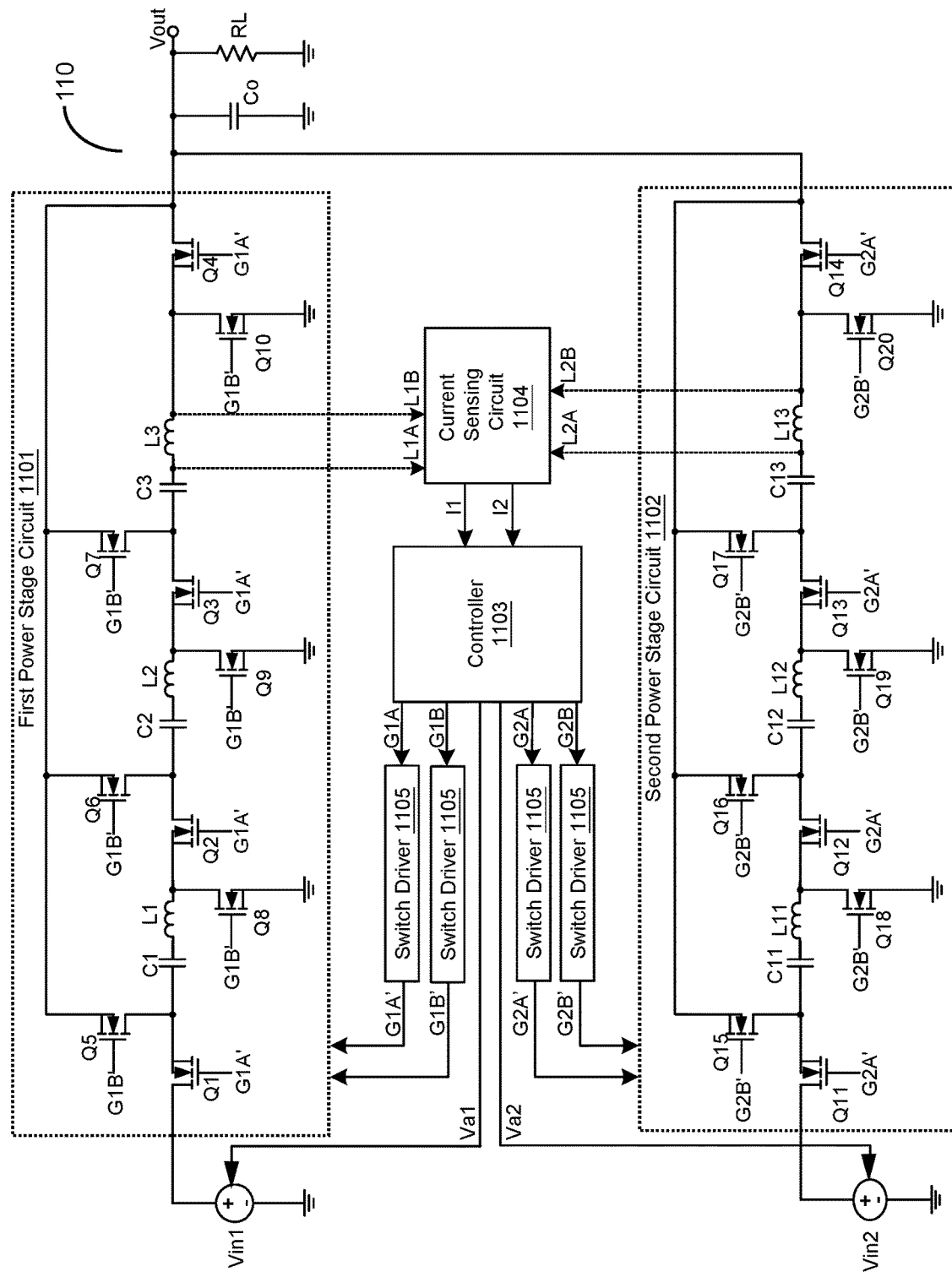
FIG. 11 shows a schematic circuit diagram of a resonant switching power converter according to still another embodiment of the present invention.

Please refer to FIG. 11, which shows a schematic circuit diagram of a resonant switching power converter according to still another embodiment of the present invention. This embodiment shown in FIG. 11 is similar to the embodiment shown in FIG. 6, but is different in that: this embodiment shown in FIG. 11 adopts two input voltages. For example, in this embodiment shown in FIG. 11, a first power stage circuit and a second power stage circuit respectively convert an input voltage Vin1 and an input voltage Vin2 to an output voltage Vout. In contrast, the embodiment shown in FIG. 6 simply adopts one single input voltage. In one embodiment, the resonant switching power converter 110 can be implemented as an interleaving type power converter shown in FIG. 11. That is, when the first power stage circuit 1101 of the resonant switching power converter 110 is in a first charging process, the second power stage circuit 1102 of the resonant switching power converter 80 is executing a second discharging process. Likewise, when the first power stage circuit 1101 of the resonant switching power converter 110 is in a first discharging process, the second power stage circuit 1102 of the resonant switching power converter 110 is executing a second charging process. In other words, when the first switches Q1-Q4 are enabled by the first charging operation signal G1A generated from the controller 1103, the second switches Q15-Q20 are enabled by the second discharging operation signal G2B generated from the controller 1103. When the first switches Q5-Q10 are enabled by the first discharging operation signal G1B generated from the controller 1103, the second switches Q15-Q20 are enabled by the second charging operation signal G2A generated from the controller 1103.

The first switches Q1-Q10, the first first capacitors C1-C3, the first inductors L1-L3, the second switches Q11-Q20, the second second capacitors C11-C13, the second inductors L11-L13, the current sensing circuit 1104 and the switch drivers 1105 of this embodiment shown in FIG. 11 are similar to the first switches Q1-Q10, the first first capacitors C1-C3, the first inductors L1-L3, the second switches Q11-Q20, the second second capacitors C11-C13, the second inductors L11-L13, the current sensing circuit 604 and the switch drivers 605 of the embodiment shown in FIG. 6, so the details thereof are not redundantly repeated here. The controller 1103 is configured to operably generate a first charging operation signal G1A corresponding to a first charging process and at least one first discharging operation signal G1B corresponding to at least one first discharging process, so as to operate the first switches Q1-Q10, so that the first switches Q1-Q10 switch electrical connection relationships of the first capacitors C1-C3. Besides, the controller 1103 is configured to operably generate a second charging operation signal G2A corresponding to a second charging process and at least one second discharging operation signal G2B corresponding to at least one second discharging process, so as to operate the second switches Q11-Q20, so that the second switches Q11-Q20 switch electrical connection relationships of the second capacitors C11-C13. Moreover, the controller 1103 is further configured to operably generate an input voltage delay interval adjustment signal Va1 and an input voltage delay interval adjustment signal Va2, so as to respectively adjust the input voltage Vin1 and the input voltage Vin2. The controller 1103 is coupled to the current sensing circuit 1104. The current sensing circuit 1104 is configured to operably adjust at least one of the input voltage Vin1 and the input voltage Vin2 according to the first current sensing signal I1 and the second current sensing signal I2, so that a constant ratio between an output current of the first power stage circuit 1101 and an output current of the second power stage circuit 1102 is achieved. In one embodiment, the controller 1103 and the current sensing circuit 1104 can be implemented as the configuration shown in FIG. 9.

Figure 12:
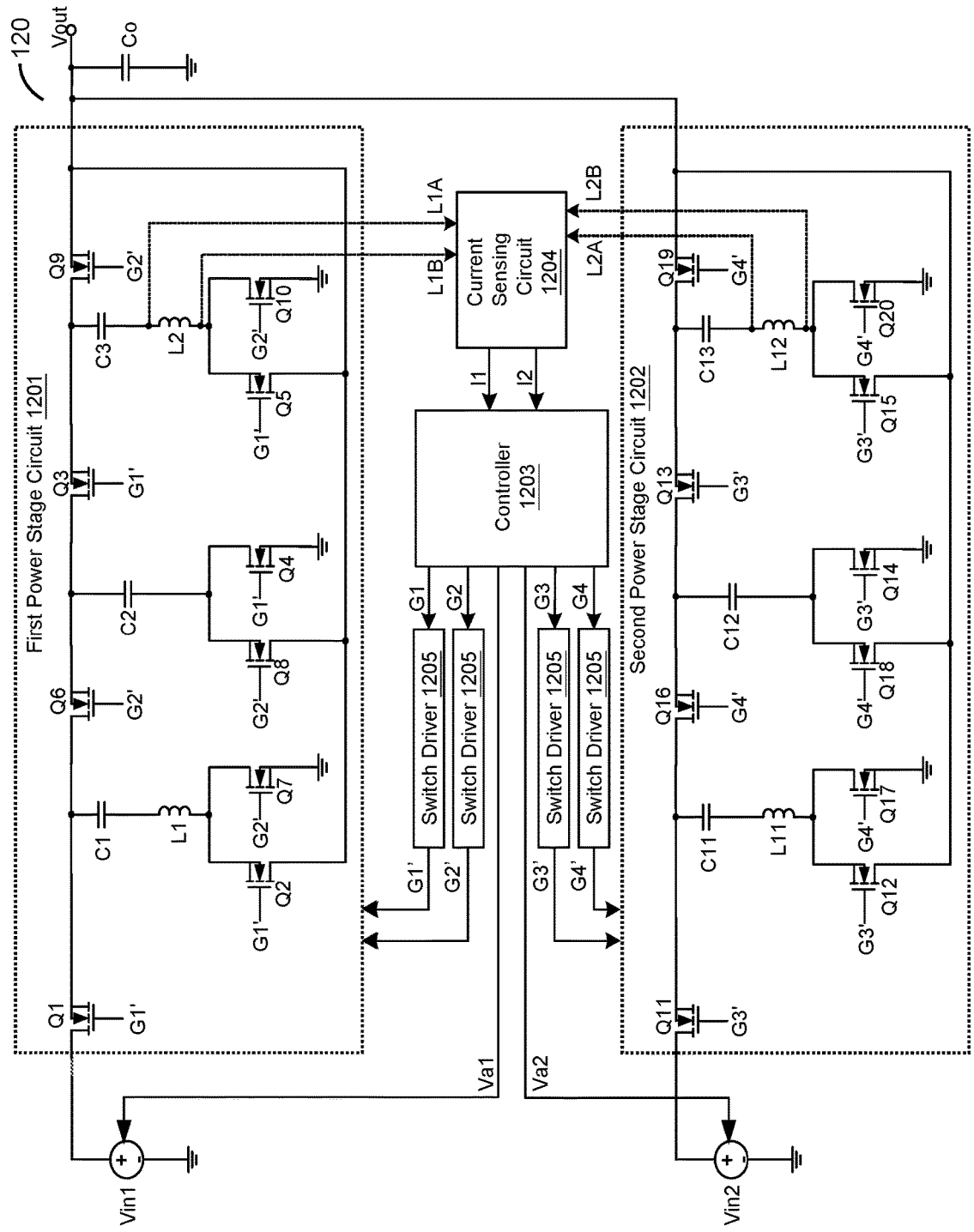
FIG. 12 shows a schematic circuit diagram of a resonant switching power converter according to still another embodiment of the present invention.

Please refer to FIG. 12, which shows a schematic circuit diagram of a resonant switching power converter according to still another embodiment of the present invention. This embodiment shown in FIG. 12 is similar to the embodiment shown in FIG. 7, but is different in that: this embodiment shown in FIG. 12 adopts two input voltages. For example, in this embodiment shown in FIG. 12, a first power stage circuit and a second power stage circuit respectively convert an input voltage Vin1 and an input voltage Vin2 to an output voltage Vout. In contrast, the embodiment shown in FIG. 7 simply adopts one single input voltage. In one embodiment, the resonant switching power converter 120 can be implemented as an interleaving type power converter shown in FIG. 12. That is, when the first power stage circuit 1201 of the resonant switching power converter 120 is in a first resonant process, the second power stage circuit 1202 of the resonant switching power converter 120 is executing a fourth resonant process. Likewise, when the first power stage circuit 1201 of the resonant switching power converter 120 is in a second resonant process, the second power stage circuit 1202 of the resonant switching power converter 120 is executing a third resonant process. In other words, when the first switches Q1-Q5 are enabled by the first resonant operation signal G1 generated from the controller 1203, the second switches Q16-Q20 are enabled by the fourth resonant operation signal G4 generated from the controller 1203. When the first switches Q6-Q10 are enabled by the second resonant operation signal G2 generated from the controller 1203, the second switches Q11-Q15 are enabled by the third resonant operation signal G3 generated from the controller 1203.

The first switches Q1-Q10, the first first capacitors C1-C3, the first inductors L1-L2, the second switches Q11-Q20, the second second capacitors C11-C13, the second inductors L11-L12, the current sensing circuit 1204 and the switch drivers 1205 of this embodiment shown in FIG. 7 are similar to the first switches Q1-Q10, the first first capacitors C1-C3, the first inductors L1-L2, the second switches Q11-Q20, the second second capacitors C11-C13, the second inductors L11-L12, the current sensing circuit 704 and the switch drivers 705 of the embodiment shown in FIG. 7, so the details thereof are not redundantly repeated here. The controller 1203 is configured to operably generate a first resonant operation signal G1 corresponding to a first resonant process and a second resonant operation signal G2 corresponding to a second resonant process, so as to operate the first switches Q1-Q10, so that the first switches Q1-Q10 switch electrical connection relationships of the first capacitors C1-C3. Besides, the controller 1203 is configured to operably generate a third resonant operation signal G3 corresponding to a third resonant process and a fourth resonant operation signal G4 corresponding to a fourth resonant process, so as to operate the second switches Q11-Q20, so that the second switches Q11-Q20 switch electrical connection relationships of the second capacitors C11-C13. Moreover, the controller 1203 is further configured to operably generate an input voltage delay interval adjustment signal Va1 and an input voltage delay interval adjustment signal Va2, so as to respectively adjust the input voltage Vin1 and the input voltage Vin2. The controller 1203 is coupled to the current sensing circuit 1204. The current sensing circuit 1204 is configured to operably adjust at least one of the input voltage Vin1 and the input voltage Vin2 according to the first current sensing signal I1 and the second current sensing signal I2, so that a constant ratio between an output current of the first power stage circuit 1201 and an output current of the second power stage circuit 1202 is achieved. In one embodiment, the controller 1203 and the current sensing circuit 1204 can be implemented as the configuration shown in FIG. 9.

Figure 13:
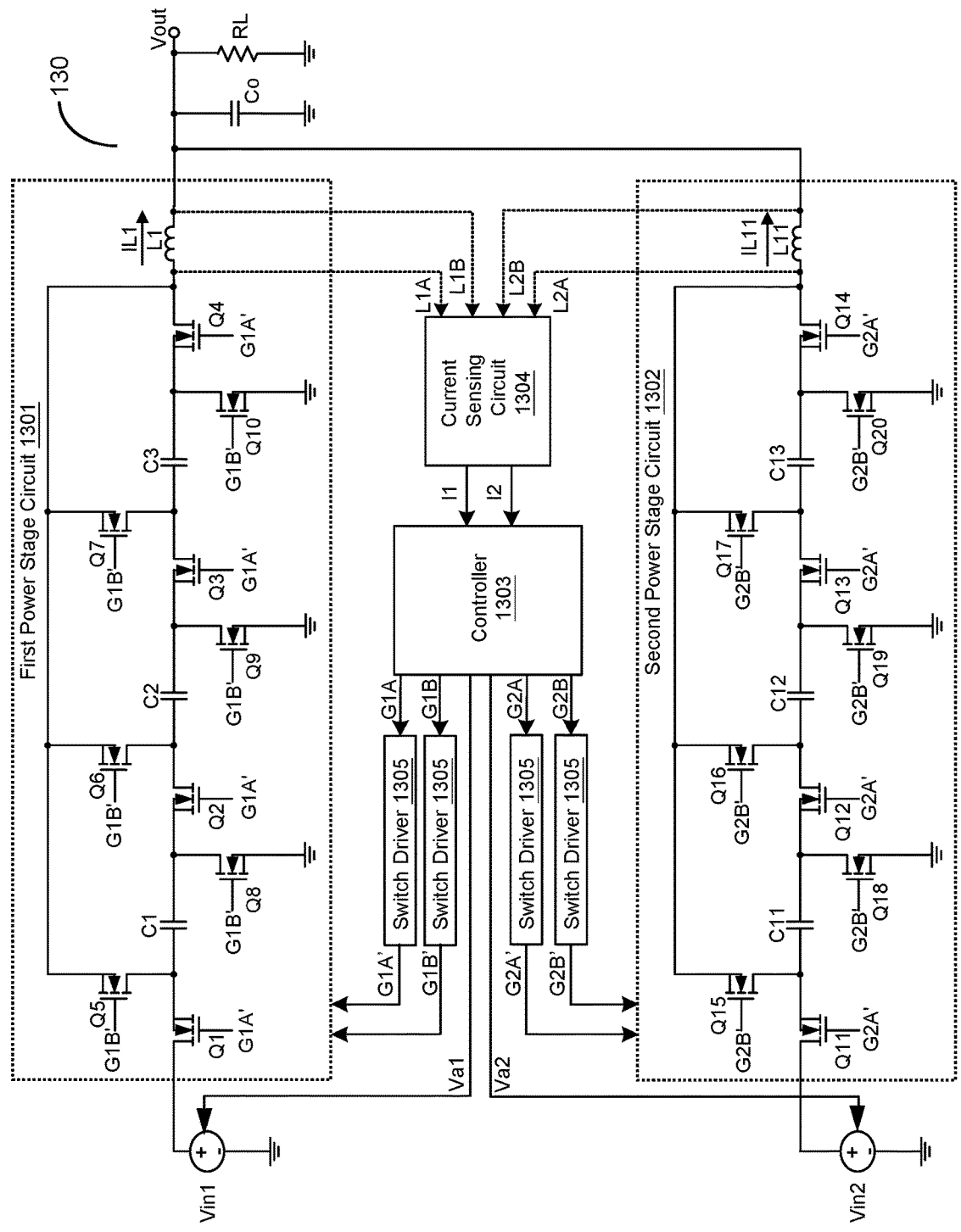
FIG. 13 shows a schematic circuit diagram of a resonant switching power converter according to still another embodiment of the present invention.

Please refer to FIG. 13, which shows a schematic circuit diagram of a resonant switching power converter according to still another embodiment of the present invention. This embodiment shown in FIG. 13 is similar to the embodiment shown in FIG. 2, but is different in that: this embodiment shown in FIG. 13 adopts two input voltages. For example, in this embodiment shown in FIG. 13, a first power stage circuit and a second power stage circuit respectively convert an input voltage Vin1 and an input voltage Vin2 to an output voltage Vout. In contrast, the embodiment shown in FIG. 2 simply adopts one single input voltage. The first switches Q1-Q10, the first first capacitors C1-C3, the first inductor L1, the second switches Q11-Q20, the second second capacitors C11-C13, the second inductor L11, the current sensing circuit 1304 and the switch drivers 1305 of this embodiment shown in FIG. 13 are similar to the first switches Q1-Q10, the first first capacitors C1-C3, the first inductor L1, the second switches Q11-Q20, the second second capacitors C11-C13, the second inductor L11, the current sensing circuit 204 and the switch drivers 205 of the embodiment shown in FIG. 2, so the details thereof are not redundantly repeated here. The controller 1303 is configured to operably generate a first charging operation signal G1A corresponding to a first charging process and at least one first discharging operation signal G1B corresponding to at least one first discharging process, so as to operate the first switches Q1-Q10, so that the first switches Q1-Q10 are configured to switch electrical connection relationships of the first capacitors C1-C3. Besides, the controller 1303 is configured to operably generate a second charging operation signal G2A corresponding to a second charging process and at least one second discharging operation signal G2B corresponding to at least one second discharging process, so as to operate the second switches Q11-Q20, so that the second switches Q11-Q20 are configured to switch electrical connection relationships of the second capacitors C11-C13. Moreover, the controller 1303 is further configured to operably generate an input voltage delay interval adjustment signal Va1 and an input voltage delay interval adjustment signal Va2, so as to respectively adjust the input voltage Vin1 and the input voltage Vin2. The controller 1303 is coupled to the current sensing circuit 1304. The current sensing circuit 1304 is configured to operably adjust at least one of the first delay interval, the second delay interval, the third delay interval and the fourth delay interval, the input voltage Vin1 and/or the input voltage Vin2 according to the first current sensing signal I1 and the second current sensing signal I2, so that a constant ratio between an output current of the first power stage circuit 801 and an output current of the second power stage circuit 802 is achieved. In one embodiment, the first power stage circuit 1301 and the second power stage circuit 1302 can be implemented as an interleaving type power converter shown in FIG. 8. Under such situation, the first power stage circuit 1301 and the second power stage circuit 1302 operate by alternating phases with each other.

It is worthwhile noting that, in different embodiments, the controller 1303 can determine the initiation time point and the period length of the charging process and the initiation time point and the period length of the discharging process via various different approaches. In one embodiment, the controller 1303 can generate a loop control signal according to the output voltage Vout or the output current, so as to determine the initiation time point and the period length of the charging process and the initiation time point and the period length of the discharging process. In another embodiment, the controller 1303 can determine the initiation time point and the period length of the charging process and the initiation time point and the period length of the discharging process according to a time point at which the inductor current crosses over zero current. The above-mentioned efficacy of current balance control can be achieved more precisely by controlling the above-mentioned delay intervals or input voltages, so that a constant ratio between an output current of the first power stage circuit and an output current of the second power stage circuit is accurately achieved.

Figure 14:
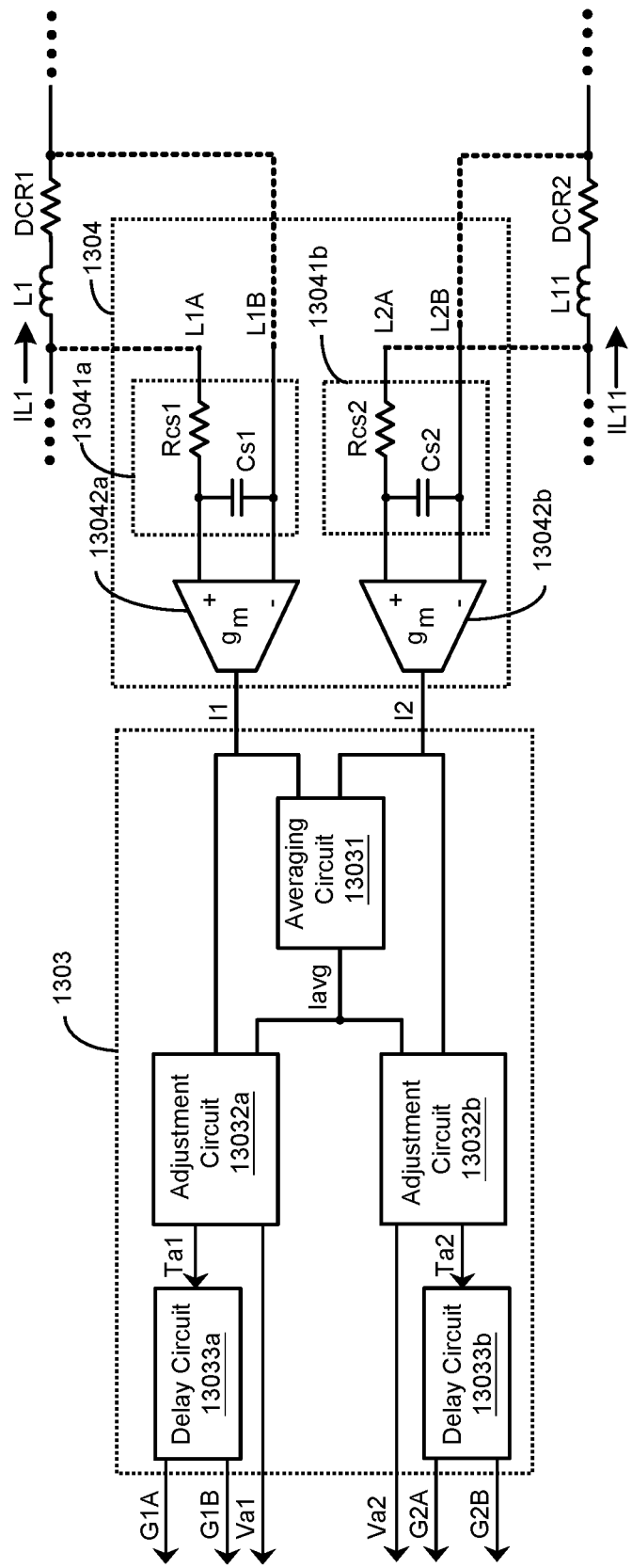
FIG. 14 shows a schematic circuit diagram of a controller of a resonant switching power converter and a current sensing circuit of the resonant switching power converter according to an embodiment of the present invention.

Please refer to FIG. 14, which shows a schematic circuit diagram of an embodiment of a controller and an embodiment of a current sensing circuit. To be more specific, FIG. 14 shows an embodiment of the controller 1303 and an embodiment of the current sensing circuit 1304 shown in FIG. 13. The averaging circuit 13031, the voltage sensing circuit 13041a, the voltage sensing circuit 13041b, the resistor Rcs1, the resistor Rcs2, the converter 13042a and the converter 13042b of this embodiment shown in FIG. 14 operate in the same way as the averaging circuit 2031, the voltage sensing circuit 2041a, the voltage sensing circuit 2041b, the resistor Rcs1, the resistor Rcs2, the converter 2042a and the converter 2042b of the embodiment shown in FIG. 3, so the details thereof are not redundantly repeated here. This embodiment shown in FIG. 14 is different from the embodiment shown in FIG. 3, in that: in the controller 1303 of this embodiment, the adjustment circuit 13032a is coupled to the averaging circuit 13031 and the current sensing circuit 1304, and the adjustment circuit 13032b is coupled to the averaging circuit 13031 and the current sensing circuit 1304. The adjustment circuit 13032a is configured to operably compare the current average signal Iavg with the first current sensing signal I1, so as to generate an input voltage adjustment signal Va1, which is transmitted to adjust the input voltage Vin1, and/or so as to generate a delay interval adjustment signal Ta1, which is transmitted to a delay circuit 13033a. The adjustment circuit 13032b is configured to operably compare the current average signal Iavg with the second current sensing signal I2, so as to generate an input voltage adjustment signal Va2, which is transmitted to adjust the input voltage Vin2, and/or so as to generate a delay interval adjustment signal Ta2, which is transmitted to a delay circuit 13033b. In other words, this embodiment can adjust the delay intervals and/or a corresponding input voltage according to the current sensing signals, so as to achieve current balance. In one embodiment, the input voltage Vin1 and the input voltage Vin2 are increased or decreased according to the input voltage adjustment signal Va1 and the input voltage adjustment signal Va2, respectively, so that a constant ratio between an output current of the first power stage circuit 1301 and an output current of the second power stage circuit 1302 is achieved. In one embodiment, the delay circuit 13033a is configured to operably adjust the above-mentioned first delay interval and second delay interval according to the delay interval adjustment signal Ta1, so as to generate the first charging operation signal G1A and the first discharging operation signal G1B, and the delay circuit 13033b is configured to operably adjust the above-mentioned third delay interval and fourth delay interval according to the delay interval adjustment signal Ta2, so as to generate the second charging operation signal G2A and the second discharging operation signal G2B, whereby the constant ratio between the output current of the first power stage circuit 1301 and the output current of the second power stage circuit 1302 is achieved.

In one embodiment, when the first current sensing signal I1 is greater than the current average signal Iavg, the controller 1303 is configured to operably decrease the input voltage Vin. When the first current sensing signal I1 is smaller than the current average signal Iavg, the controller 1303 is configured to operably increase the input voltage Vin. When the second current sensing signal I2 is greater than the current average signal Iavg, the controller 1303 is configured to operably decrease the input voltage Vin2. When the second current sensing signal I2 is smaller than the current average signal Iavg, the controller 1303 is configured to operably increase the input voltage Vin2. In one embodiment, when the first current sensing signal I1 is greater than the current average signal Iavg, the controller 1303 is configured to operably prolong the first delay interval and/or the second delay interval. When the first current sensing signal I1 is smaller than the current average signal Iavg, the controller 1303 is configured to operably shorten the first delay interval and/or the second delay interval. When the second current sensing signal I2 is greater than the current average signal Iavg, the controller 1303 is configured to operably prolong the third delay interval and/or the fourth delay interval. When the second current sensing signal I2 is smaller than the current average signal Iavg, the controller 1303 is configured to operably shorten the third delay interval and/or the fourth delay interval.

Figure 1:
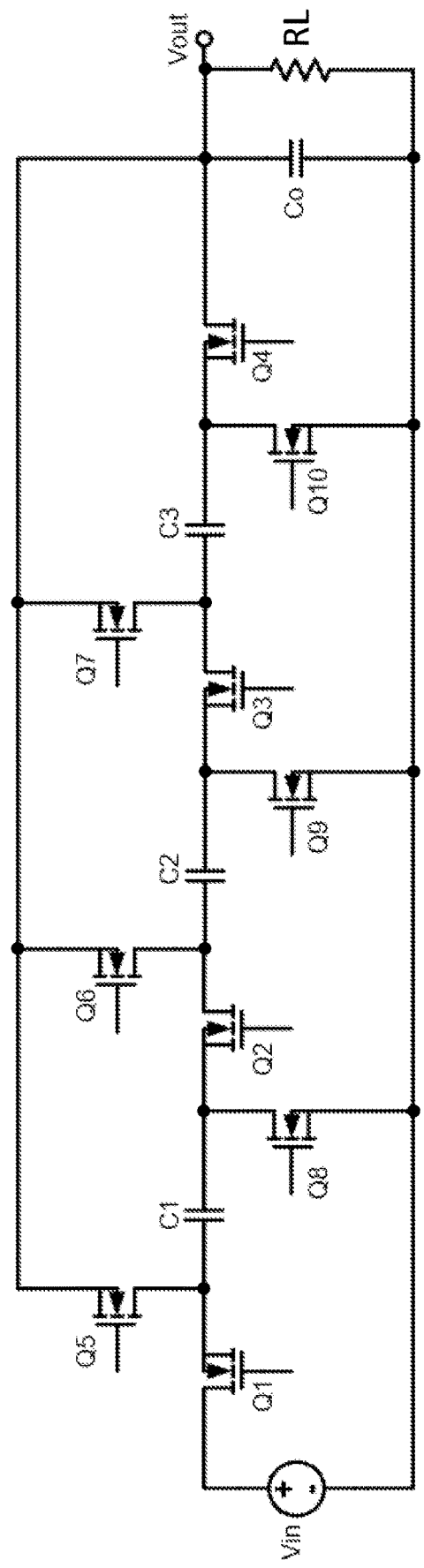
FIG. 1 shows a schematic diagram of a conventional power converter.
Figure 15:
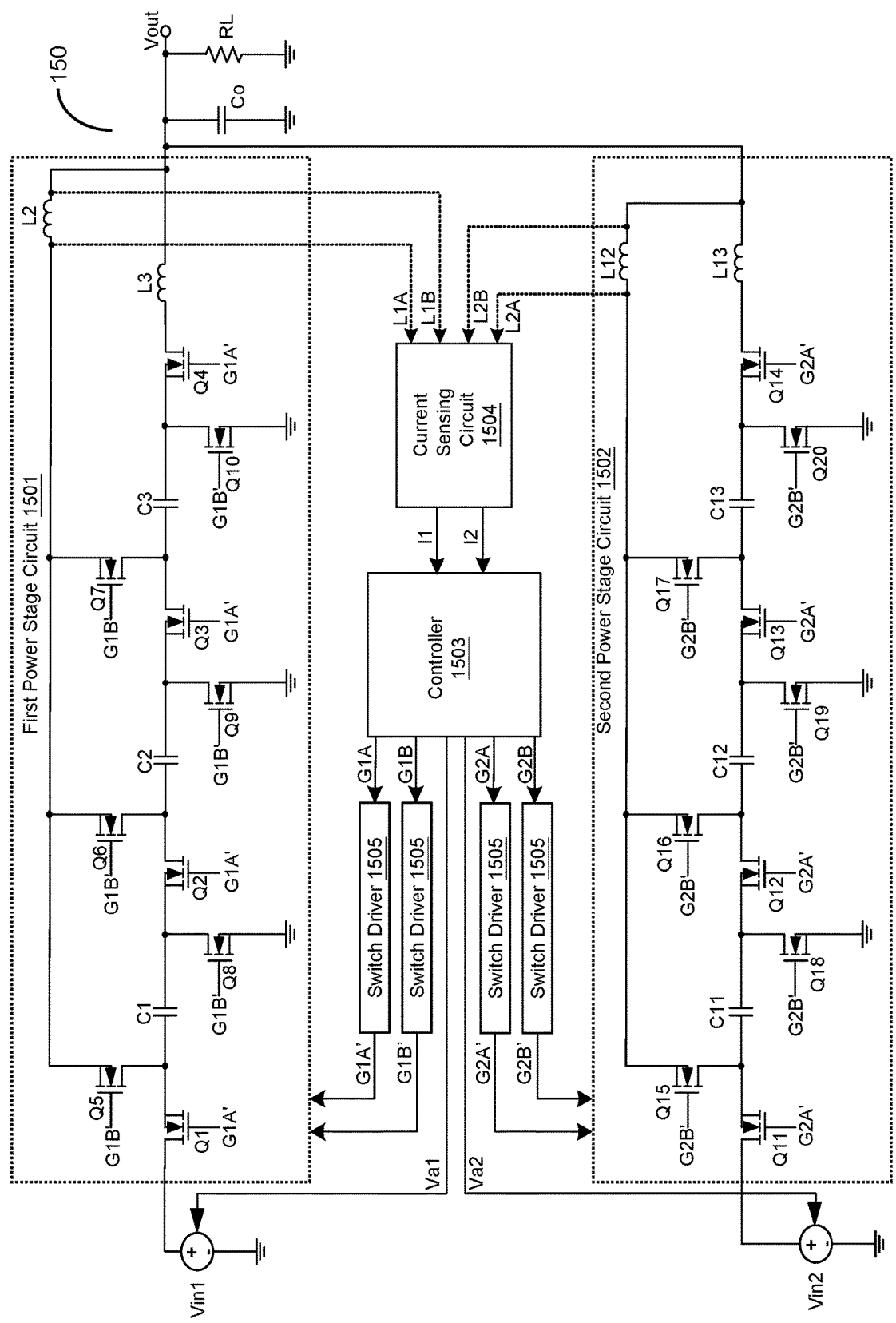
FIG. 15 shows a schematic circuit diagram of a resonant switching power converter according to still another embodiment of the present invention.

Please refer to FIG. 15, which shows a schematic circuit diagram of a resonant switching power converter according to still another embodiment of the present invention. This embodiment shown in FIG. 15 is similar to the embodiment shown in FIG. 5, but is different in that: this embodiment shown in FIG. 15 adopts two input voltages. For example, in this embodiment shown in FIG. 15, a first power stage circuit and a second power stage circuit respectively convert an input voltage Vin1 and an input voltage Vin2 to an output voltage Vout. In contrast, the embodiment shown in FIG. 5 simply adopts one single input voltage. The first switches Q1-Q10, the first first capacitors C1-C3, the first charging inductor L3, the first discharging inductor L2, the second switches Q11-Q20, the second second capacitors C11-C13, the second charging inductor L13, the second discharging inductor L12, the current sensing circuit 1504 and the switch drivers 1505 of this embodiment shown in FIG. 1 are similar to the first switches Q1-Q10, the first first capacitors C1-C3, the first charging inductor L3, the first discharging inductor L2, the second switches Q11-Q20, the second second capacitors C11-C13, the second charging inductor L13, the second discharging inductor L12, the current sensing circuit 504 and the switch drivers 505 of the embodiment shown in FIG. 5, so the details thereof are not redundantly repeated here.

The controller 1503 is configured to operably generate a first charging operation signal G1A corresponding to a first charging process and at least one first discharging operation signal G1B corresponding to at least one first discharging process, so as to operate the first switches Q1-Q10, so that the first switches Q1-Q10 are configured to switch electrical connection relationships of the first capacitors C1-C3. Besides, the controller 1503 is configured to operably generate a second charging operation signal G2A corresponding to a second charging process and at least one second discharging operation signal G2B corresponding to at least one second discharging process, so as to operate the second switches Q11-Q20, so that the second switches Q11-Q20 are configured to switch electrical connection relationships of the second capacitors C11-C13. Moreover, the controller 1503 can be further configured to operably generate an input voltage delay interval adjustment signal Va1 and an input voltage delay interval adjustment signal Va2, so as to respectively adjust the input voltage Vin1 and the input voltage Vin2. The controller 1503 is coupled to the current sensing circuit 1504. The current sensing circuit 1504 is configured to operably adjust at least one of the first delay interval, the second delay interval, the third delay interval and the fourth delay interval, the input voltage Vin1 and/or the input voltage Vin2 according to the first current sensing signal I1 and the second current sensing signal I2, so that a constant ratio between an output current of the first power stage circuit 1501 and an output current of the second power stage circuit 1502 is achieved. In one embodiment, the controller 1503 and the current sensing circuit 1504 can be implemented as the configuration shown in FIG. 14. In one embodiment, the first power stage circuit 1501 and the second power stage circuit 1502 can be implemented as an interleaving type power converter shown in FIG. 10. Under such situation, the first power stage circuit 1501 and the second power stage circuit 1502 operate by alternating phases with each other.

Figure 16:
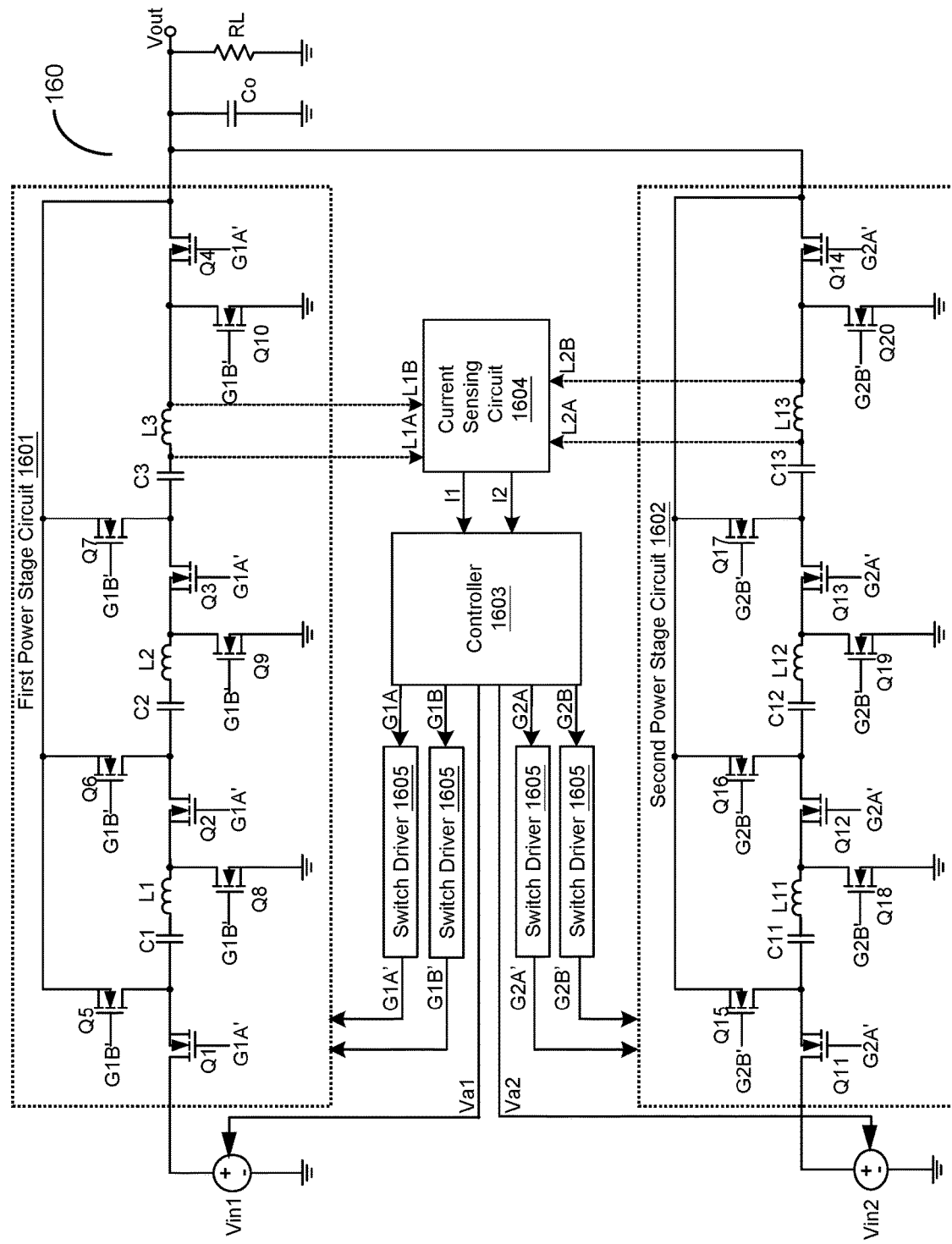
FIG. 16 shows a schematic circuit diagram of a resonant switching power converter according to still another embodiment of the present invention.

Please refer to FIG. 16, which shows a schematic circuit diagram of a resonant switching power converter according to still another embodiment of the present invention. This embodiment shown in FIG. 16 is similar to the embodiment shown in FIG. 6, but is different in that: this embodiment shown in FIG. 16 adopts two input voltages. For example, in this embodiment shown in FIG. 16, a first power stage circuit and a second power stage circuit respectively convert an input voltage Vin1 and an input voltage Vin2 to an output voltage Vout. In contrast, the embodiment shown in FIG. 6 simply adopts one single input voltage. The first switches Q1-Q10, the first first capacitors C1-C3, the first inductors L1-L3, the second switches Q11-Q20, the second second capacitors C11-C13, the second inductors L11-L13, the current sensing circuit 1604 and the switch drivers 1605 of this embodiment shown in FIG. 16 are similar to the first switches Q1-Q10, the first first capacitors C1-C3, the first inductors L1-L3, the second switches Q11-Q20, the second second capacitors C11-C13, the second inductors L11-L13, the current sensing circuit 604 and the switch drivers 605 of the embodiment shown in FIG. 6, so the details thereof are not redundantly repeated here.

The controller 1603 is configured to operably generate a first charging operation signal G1A corresponding to a first charging process and at least one first discharging operation signal G1B corresponding to at least one first discharging process, so as to operate the first switches Q1-Q10, so that the first switches Q1-Q10 are configured to switch electrical connection relationships of the first capacitors C1-C3. Besides, the controller 1603 is configured to operably generate a second charging operation signal G2A corresponding to a second charging process and at least one second discharging operation signal G2B corresponding to at least one second discharging process, so as to operate the second switches Q11-Q20, so that the second switches Q11-Q20 are configured to switch electrical connection relationships of the second capacitors C11-C13. Moreover, the controller 1603 can be further configured to operably generate an input voltage delay interval adjustment signal Va1 and an input voltage delay interval adjustment signal Va2, so as to respectively adjust the input voltage Vin1 and the input voltage Vin2. The controller 1603 is coupled to the current sensing circuit 1604. The current sensing circuit 1604 is configured to operably adjust at least one of the first delay interval, the second delay interval, the third delay interval and the fourth delay interval, the input voltage Vin1 and/or the input voltage Vin2 according to the first current sensing signal I1 and the second current sensing signal I2, so that a constant ratio between an output current of the first power stage circuit 801 and an output current of the second power stage circuit 802 is achieved. In one embodiment, the controller 1603 and the current sensing circuit 1604 can be implemented as the configuration shown in FIG. 14. In one embodiment, the first power stage circuit 1601 and the second power stage circuit 1602 can be implemented as an interleaving type power converter shown in FIG. 11. Under such situation, the first power stage circuit 1601 and the second power stage circuit 1602 operate by alternating phases with each other.

Figure 17:
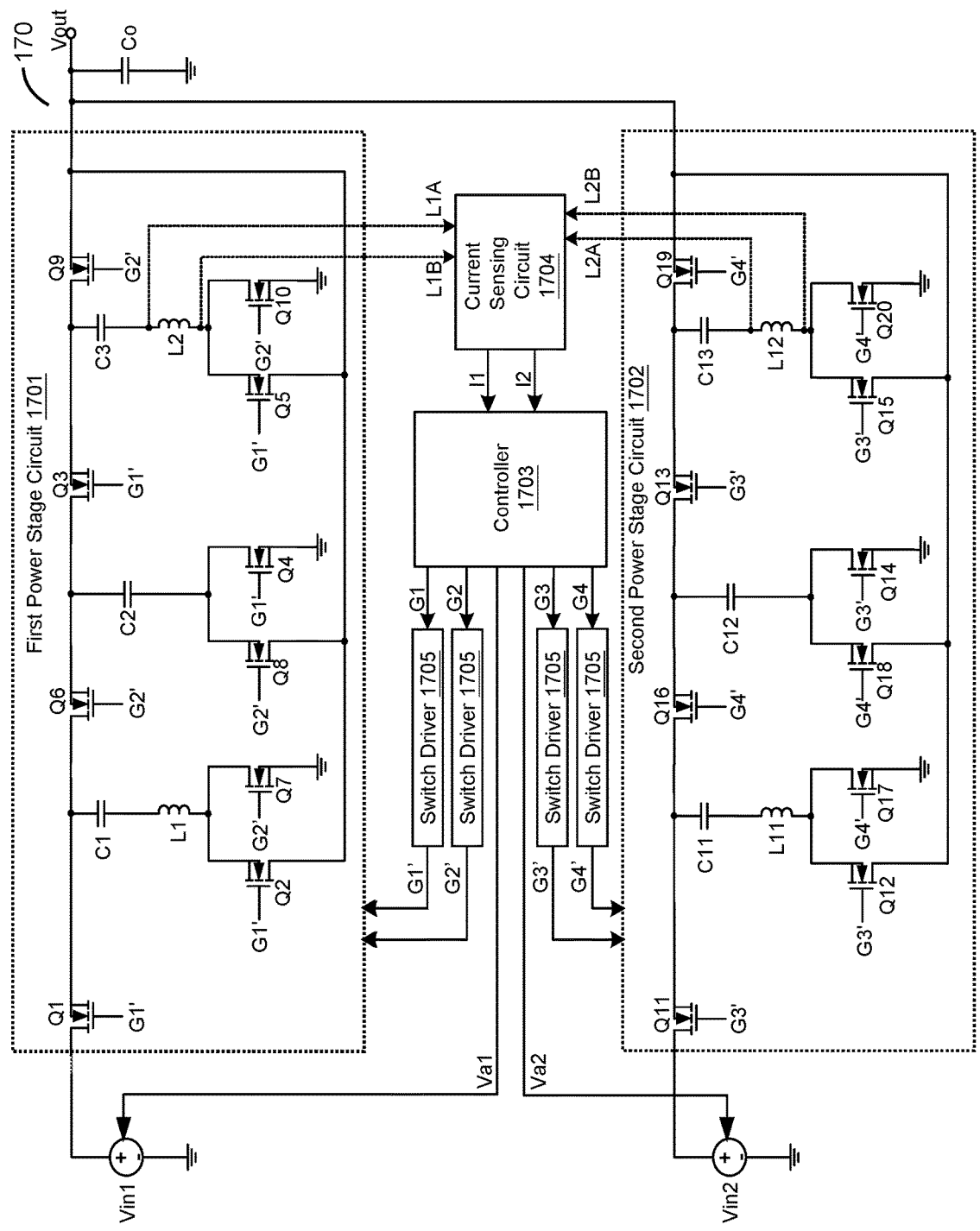
FIG. 17 shows a schematic circuit diagram of a resonant switching power converter according to still another embodiment of the present invention.

Please refer to FIG. 17, which shows a schematic circuit diagram of a resonant switching power converter according to still another embodiment of the present invention. This embodiment shown in FIG. 17 is similar to the embodiment shown in FIG. 7, but is different in that: this embodiment shown in FIG. 17 adopts two input voltages. For example, in this embodiment shown in FIG. 17, a first power stage circuit and a second power stage circuit respectively convert an input voltage Vin1 and an input voltage Vin2 to an output voltage Vout. In contrast, the embodiment shown in FIG. 7 simply adopts one single input voltage. The first switches Q1-Q10, the first first capacitors C1-C3, the first inductors L1-L2, the second switches Q11-Q20, the second second capacitors C11-C13, the second inductors L11-L12, the current sensing circuit 1704 and the switch drivers 1705 of this embodiment shown in FIG. 17 are similar to the first switches Q1-Q10, the first first capacitors C1-C3, the first inductors L1-L2, the second switches Q11-Q20, the second second capacitors C11-C13, the second inductors L11-L12, the current sensing circuit 704 and the switch drivers 705 of the embodiment shown in FIG. 7, so the details thereof are not redundantly repeated here.

The controller 1703 is configured to operably generate a first resonant operation signal G1 corresponding to a first resonant process and a second resonant operation signal G2 corresponding to a second resonant process, so as to operate the first switches Q1-Q10, so that the first switches Q1-Q10 are configured to switch electrical connection relationships of the first capacitors C1-C3. Besides, the controller 1703 is configured to operably generate a third resonant operation signal G3 corresponding to a third resonant process and a fourth resonant operation signal G4 corresponding to a fourth resonant process, so as to operate the second switches Q11-Q20, so that the second switches Q11-Q20 are configured to switch electrical connection relationships of the second capacitors C11-C13. Moreover, the controller 1703 can be further configured to operably generate an input voltage delay interval adjustment signal Va1 and an input voltage delay interval adjustment signal Va2, so as to respectively adjust the input voltage Vin1 and the input voltage Vin2. The controller 1703 is coupled to the current sensing circuit 1704. The current sensing circuit 1704 is configured to operably adjust at least one of the first delay interval, the second delay interval, the third delay interval and the fourth delay interval, the input voltage Vin1 and/or the input voltage Vin2 according to the first current sensing signal I1 and the second current sensing signal I2, so that a constant ratio between an output current of the first power stage circuit 1701 and an output current of the second power stage circuit 1702 is achieved. In one embodiment, the controller 1703 and the current sensing circuit 1704 can be implemented as the configuration shown in FIG. 14. In one embodiment, the first power stage circuit 1701 and the second power stage circuit 1702 can be implemented as an interleaving type power converter shown in FIG. 12. Under such situation, the first power stage circuit 1701 and the second power stage circuit 1702 operate by alternating phases with each other.

Figure 18:
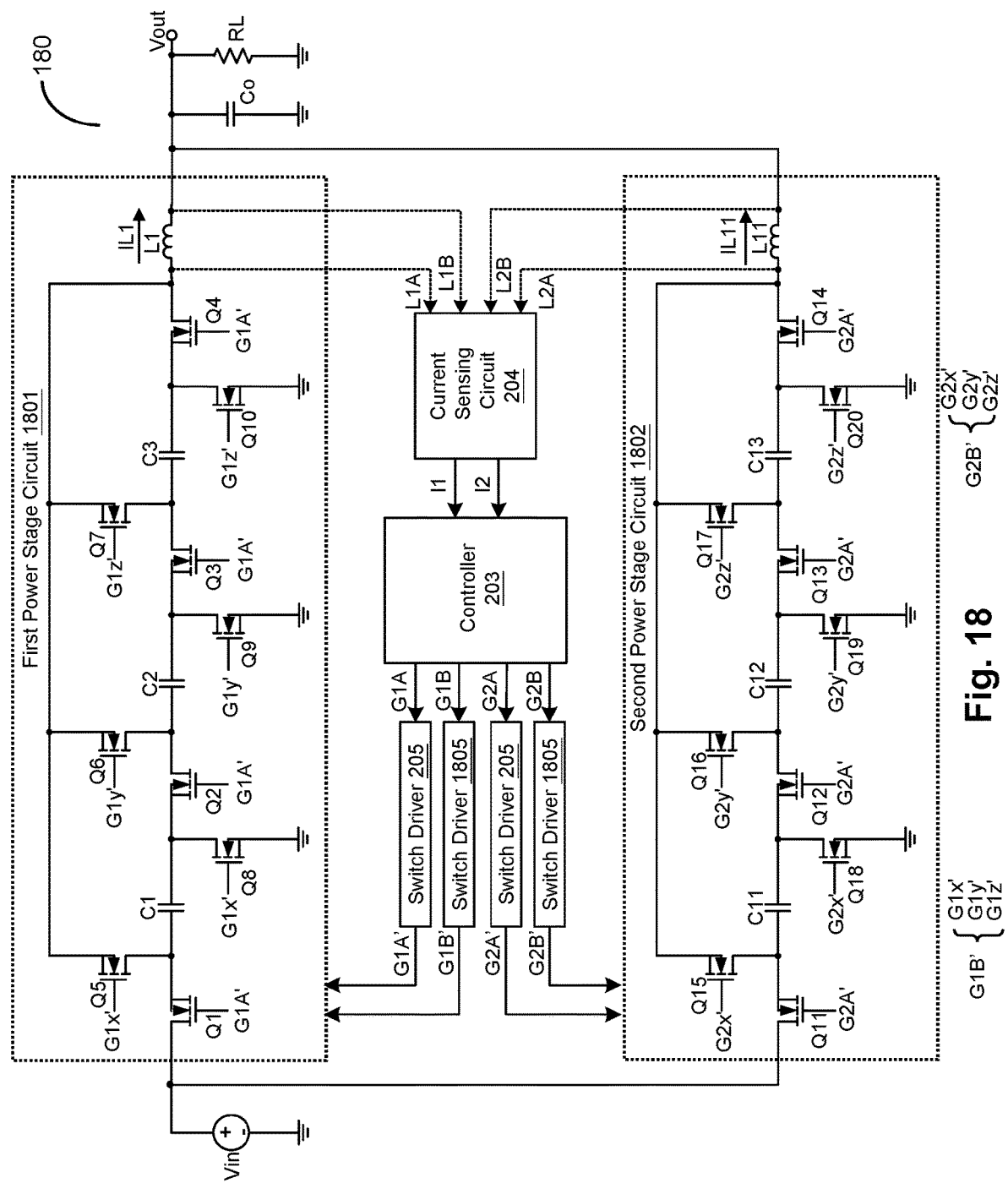
FIG. 18 shows a schematic circuit diagram of a resonant switching power converter according to still another embodiment of the present invention.

Please refer to FIG. 18, which shows a schematic circuit diagram of a resonant switching power converter according to still another embodiment of the present invention. This embodiment shown in FIG. 18 is similar to the embodiment shown in FIG. 2, but is different in that: in this embodiment shown in FIG. 18, the first capacitors C1, C2 and C3 in the first power stage circuit 1801 are discharged in sequential order in the discharging process, and the second capacitors C11, C12 and C13 in the second power stage circuit 1802 are discharged in sequential order in the discharging process. In this embodiment, the first discharging operation signal G1B includes plural discharging operation sub-signals. The switch drivers 1805 are configured to operably generate corresponding driving sub-signals G1$x'$, G1$y'$ and G1$z'$ according to the discharging operation sub-signals. The driving sub-signals G1$x'$, G1$y'$ and G1$z'$ are configured to operably control first switches Q5 and Q8, Q6 and Q9, and, Q7 and Q10, so as to discharge the first capacitors C1, C2 and C3 in sequential order. Also, the second discharging operation signal G2B includes plural discharging operation sub-signals, and the switch drivers 1805 are configured to operably generate corresponding driving sub-signals G2$x'$, G2$y'$ and G2$z'$ according to the discharging operation sub-signals. The driving sub-signals G2$x'$, G2$y'$ and G2$z'$ are configured to operably control second switches Q15 and Q18, Q16 and Q19, and, Q17 and Q20, so as to discharge the second capacitors C11, C12 and C13 in sequential order.

In this embodiment, the second delay interval for example can correspond to one of the initiation time points when the first capacitors C1, C2 and C3 start being discharged. The fourth delay interval for example can correspond to one of the initiation time points when the second capacitors C11, C12 and C13 start being discharged.

The present invention provides resonant switching power converters as described above. The resonant switching power converters at the present invention can achieve current balance by sensing and comparing currents of multiple power stage circuits therein, without requiring additional current sensing resistors. Besides, the present invention can reduce the inrush current and have better conversion efficiency as compared to the conventional power converters.

The present invention has been described in considerable detail with reference to certain preferred embodiments thereof. It should be understood that the description is for illustrative purpose, not for limiting the broadest scope of the present invention. An embodiment or a claim of the present invention does not need to achieve all the objectives or advantages of the present invention. The title and abstract are provided for assisting searches but not for limiting the scope of the present invention. Those skilled in this art can readily conceive variations and modifications within the spirit of the present invention. For example, to perform an action "according to" a certain signal as described in the context of the present invention is not limited to performing an action strictly according to the signal itself, but can be performing an action according to a converted form or a scaled-up or down form of the signal, i.e., the signal can be processed by a voltage-to-current conversion, a current-to-voltage conversion, and/or a ratio conversion, etc. before an action is performed. It is not limited for each of the embodiments described hereinbefore to be used alone; under the spirit of the present invention, two or more of the embodiments described hereinbefore can be used in combination. For example, two or more of the embodiments can be used together, or, a part of one embodiment can be used to replace a corresponding part of another embodiment. In view of the foregoing, the spirit of the present invention should cover all such and other modifications and variations, which should be interpreted to fall within the scope of the following claims and their equivalents.

What is claimed is:

1. A resonant switching power converter, which is configured to operably convert one or two input voltages to an output voltage; the resonant switching power converter comprising:
    a first power stage circuit, including:
    a plurality of first capacitors;
    at least one first charging inductor;
    at least one first discharging inductor; and
    a plurality of first switches, which are configured to operably switch electrical connection relationships among the plurality of first capacitors, the at least one first charging inductor and the at least one first discharging inductor;
    a second power stage circuit, including:
    a plurality of second capacitors;
    at least one second charging inductor;
    at least one second discharging inductor; and
    a plurality of second switches, which are configured to operably switch electrical connection relationships among the plurality of second capacitors, the at least one second charging inductor and the at least one second discharging inductor; and
    a controller, which is configured to periodically operate the plurality of first switches during a first charging process and at least one first discharging process and operate the plurality of the second switches during a second charging process and at least one second discharging process;
    wherein in the first charging process, the controller is configured to operably control the plurality of first switches, so that a series connection of the plurality of first capacitors and the at least one first charging inductor is formed between the one or two input voltages and the output voltage, which forms a first charging path;
    wherein in the at least one first discharging process, the controller is configured to operably control the plurality of first switches, so that each first capacitor and a corresponding one of the at least one first discharging inductor are connected in series between the output voltage and a ground voltage level, to form a plurality of first discharging paths concurrently or in a sequential order;
    wherein in the second charging process, the controller is configured to operably control the plurality of second switches, so that a series connection of the plurality of the second capacitors and the at least one second charging inductor is formed between the one or two input voltages and the output voltage, which forms a second charging path;
    wherein in the at least one second discharging process, the controller is configured to operably control the plurality of second switches, SO that each second capacitor and a corresponding one of the at least one second discharging inductor are connected in series between the output voltage and the ground voltage level, to form a plurality of second discharging paths concurrently or in a sequential order;

wherein the controller is further configured to operably adjust at least one of a first delay interval, a second delay interval, a third delay interval, a fourth delay interval, and/or the one or two input voltages, according to a first current sensing signal and a second current sensing signal, so that a constant ratio between an output current of the first power stage circuit and an output current of the second power stage circuit is achieved;

wherein the first delay interval is configured to operably delay an initiation time point of the first charging process; wherein the second delay interval is configured to operably delay an initiation time point of the at least one first discharging process; wherein the third delay interval is configured to operably delay an initiation time point of the second charging process; wherein the fourth delay interval is configured to operably delay an initiation time point of the at least one second discharging process;

wherein the first current sensing signal is correlated with a first inductor current of the at least one first charging inductor and/or the at least one first discharging inductor, and wherein the second current sensing signal is correlated with a second inductor current of the at least one second charging inductor and/or the at least one second discharging inductor.

2. The resonant switching power converter of claim 1, wherein the at least one first charging inductor is one single first charging inductor and the at least one first discharging inductor is one single first discharging inductor, and wherein the at least one second charging inductor is one single second charging inductor and the at least one second discharging inductor is one single second discharging inductor.

3. The resonant switching power converter of claim 1, wherein the at least one first charging inductor and the at least one first discharging inductor are one same single first inductor, and wherein the at least one second charging inductor and the at least one second discharging inductor are one same single second inductor.

4. The resonant switching power converter of claim 1, wherein the controller includes at least one current sensing circuit, the at least one current sensing circuit including:

at least one voltage sensing circuit, which is configured to operably sense a voltage difference across two ends of the at least one first charging inductor and/or the at least one first discharging inductor, so as to generate a corresponding first voltage sensing signal, and the at least one voltage sensing circuit is configured to operably sense a voltage difference across two ends of the at least one second charging inductor and/or the at least one second discharging inductor, so as to generate a corresponding second voltage sensing signal; wherein the first voltage sensing signal is correlated with a voltage across a parasitic resistor of the at least one first charging inductor and/or a voltage across a parasitic resistor of the at least one first discharging inductor, and wherein the second voltage sensing signal is correlated with a voltage across a parasitic resistor of the at least one second charging inductor and/or a voltage across a parasitic resistor of the at least one second discharging inductor; and at least one converter, which is configured to operably generate the first current sensing signal according to the first voltage sensing signal and generate the second current sensing signal according to the second voltage sensing signal.

5. The resonant switching power converter of claim 1, wherein the controller further includes:

an averaging circuit, which is configured to operably execute an averaging operation on the first current sensing signal and the second current sensing signal, so as to obtain an average of the first current sensing signal and the second current sensing signal, thus generating a current average signal; and at least one adjustment circuit, which is configured to operably compare the current average signal with the first current sensing signal and/or compare the current average signal with the second current sensing signal, so as to generate an delay interval adjustment signal, wherein the delay interval adjustment signal is configured to operably adjust the first delay interval, the second delay interval, the third delay interval, the fourth delay interval or the one or two input voltages, so that the constant ratio between the output current of the first power stage circuit and the output current of the second power stage circuit is achieved.

6. The resonant switching power converter of claim 5, wherein the constant ratio between the output current of the first power stage circuit and the output current of the second power stage circuit is 1:1.

7. The resonant switching power converter of claim 5, wherein the controller further includes:

at least one delay circuit, which is configured to operably generate the first delay interval, the second delay interval, the third delay interval and/or the fourth delay interval according to the delay interval adjustment signal, so that the constant ratio between the output current of the first power stage circuit and the output current of the second power stage circuit is achieved.

8. The resonant switching power converter of claim 5, wherein the controller is configured to operably execute at least one of following adjustments so that the constant ratio between the output current of the first power stage circuit and the output current of the second power stage circuit is achieved:

when the first current sensing signal is greater than the current average signal, the controller is configured to operably prolong the first delay interval and/or the second delay interval;

when the first current sensing signal is smaller than the current average signal, the controller is configured to operably shorten the first delay interval and/or the second delay interval;

when the second current sensing signal is greater than the current average signal, the controller is configured to operably prolong the third delay interval and/or the fourth delay interval; and/or when the second current sensing signal is smaller than the current average signal, the controller is configured to operably shorten the third delay interval and/or the fourth delay interval.

9. The resonant switching power converter of claim 5, wherein the two input voltages includes a first input voltage corresponding to the first power stage circuit and a second input voltage corresponding to the second power stage circuit, and wherein the controller is configured to operably execute at least one of following adjustments so that the constant ratio between the output current of the first power stage circuit and the output current of the second power stage circuit is achieved:

when the first current sensing signal is greater than the current average signal, the controller is configured to operably decrease the first input voltage;

when the first current sensing signal is smaller than the current average signal, the controller is configured to operably increase the first input voltage;

when the second current sensing signal is greater than the current average signal, the controller is configured to operably decrease the second input voltage; and/or when the second current sensing signal is smaller than the current average signal, the controller is configured to operably increase the second input voltage.

10. The resonant s switching power converter of claim 9, wherein the first power stage circuit and the second power stage circuit are configured to operate by alternating phases with each other.

11. The resonant switching power converter of claim 1, wherein the resonant switching power converter is a bidirectional resonant switching power converter.

12. The resonant switching power converter of claim 1, wherein a voltage conversion ratio of the input voltage or input voltages to the output voltage of the resonant switching power converter is adjustable to be 4:1, 3:1 or 2:1.

13. A resonant switching power converter, which is configured to operably convert one or two input voltages to an output voltage; the resonant switching power converter comprising:
  a first power stage circuit, including:
    at least one first resonator, wherein the at least one first includes a first resonant capacitor and a first resonator resonant inductor which are connected in series to each other;
    at least one first nonresonant capacitor; and
    a plurality of first switches, which are coupled to the at least one first resonator and the at least one first nonresonant capacitor, wherein the plurality of first switches are configured to operably switch electrical connection relationships between the first resonator and the at least one first nonresonant capacitor, wherein in a first resonant process, a resonant charging operation is performed on the first resonator, and wherein in a second resonant process, a resonant discharging operation is performed on the first resonator, wherein a constant ratio of a voltage across the first resonator to the one or two input voltages is kept;
  a second power stage circuit, including:
    at least one second resonator, wherein the at least one second resonator includes a second resonant capacitor and a second resonant inductor which are connected in series to each other;
    at least one second nonresonant capacitor; and
    a plurality of second switches, which are coupled to the at least one second resonator and the at least one second nonresonant capacitor, wherein the plurality of the second switches are configured to operably switch electrical connection relationships between the second resonator and the at least one second nonresonant capacitor, wherein in a third resonant process, a resonant charging operation is performed on the second resonator, and wherein in a fourth resonant process, a resonant discharging operation is performed on the second resonator, wherein a constant ratio of a voltage across the second resonator to the one or two input voltages is kept;
  a controller, which is configured to periodically operate the plurality of first switches and the plurality of second switches during the first resonant process and the third resonant process, so as to execute the resonant charging operations, and to periodically operate the plurality of first switches and the plurality of second switches during the second resonant process and the fourth resonant process, to execute the resonant discharging operations;

wherein the controller is further configured to operably adjust at least one of a first delay interval, a second delay interval, a third delay interval, a fourth delay interval, and/or the one or two input voltages according to a first sensing signal and a second current sensing signal, so that a constant ratio between an output current of the first power stage circuit and an output current of the second power stage circuit is achieved;

wherein the first delay interval is configured to operably delay an initiation time point of the first resonant process; wherein the second delay interval is configured to operably delay an initiation time point of the second resonant process; wherein the third delay interval is configured to operably delay an initiation time point of the third resonant process; wherein the fourth delay interval is configured to operably delay an initiation time point of the fourth resonant process;

wherein the first current sensing signal is correlated with a first inductor current of the first resonant inductor, and wherein the second current sensing signal is correlated with a second inductor current of the second resonant inductor.

14. The resonant switching power converter of claim 13, wherein the controller includes at least one current sensing circuit, the at least one current sensing circuit including:
  at least one voltage sensing circuit, which is configured to operably sense a voltage difference across two ends of the first resonant inductor, so as to generate a first voltage sensing signal, and to operably sense a voltage difference across two ends of the second resonant inductor, so as to generate a second voltage sensing signal; wherein the first voltage sensing signal is correlated with a voltage across a parasitic resistor of the first resonant inductor, and wherein the second voltage sensing signal is correlated with a voltage across a parasitic resistor of the second resonant inductor; and
  at least one converter, which is configured to operably generate the first current sensing signal according to the first voltage sensing signal and to operably generate the second current sensing signal according to the second voltage sensing signal.

15. The resonant switching power converter of claim 13, wherein
  the controller further includes:
  an averaging circuit, which is configured to operably execute an averaging operation on the first current sensing signal and the second current sensing signal, so as to obtain an average of the first current sensing signal and the second current sensing signal, thus generating a current average signal; and
  at least one adjustment circuit, which is configured to operably compare the current average signal with the first current sensing signal and/or compare the current average signal with the second current sensing signal, so as to generate an delay interval adjustment signal, wherein the delay interval adjustment signal is configured to operably adjust at least one of the first delay interval, the second delay interval, the third delay interval, the fourth delay interval and/or the one or two input voltages, so that the constant ratio between the output current of the first power stage circuit and the output current of the second power stage circuit is achieved.

16. The resonant switching power converter of claim 15, wherein the constant ratio between the output current of the first power stage circuit and the output current of the second power stage circuit is 1:1.

17. The resonant switching power converter of claim 15, wherein the controller further includes:
at least one delay circuit, which is configured to operably generate the first delay interval, the second delay interval, the third delay interval and/or the fourth delay interval according to the delay interval adjustment signal, so that the constant ratio between the output current of the first power stage circuit and the output current of the second power stage circuit is achieved.

18. The resonant switching power converter of claim 15, wherein the controller is configured to operably execute at least one of following adjustments so that the constant ratio between the output current of the first power stage circuit and the output current of the second power stage circuit is achieved:
when the first current sensing signal is greater than the current average signal, the controller is configured to operably prolong the first delay interval and/or the second delay interval;
when the first current sensing signal is smaller than the current average signal, the controller is configured to operably shorten the first delay interval and/or the second delay interval;
when the second current sensing signal is greater than the current average signal, the controller is configured to operably prolong the third delay interval and/or the fourth delay interval; and/or
when the second current sensing signal is smaller than the current average signal, the controller is configured to operably shorten the third delay interval and/or the fourth delay interval.

19. The resonant switching power converter of claim 15, wherein the two input voltages includes a first input voltage corresponding to the first power stage circuit and a second input voltage corresponding to the second power stage circuit, and wherein the controller is configured to operably execute at least one of following adjustments so that the constant ratio between the output current of the first power stage circuit and the output current of the second power stage circuit is achieved:
when the first current sensing signal is greater than the current average signal, the controller is configured to operably decrease the first input voltage;
when the first current sensing signal is smaller than the current average signal, the controller is configured to operably increase the first input voltage;
when the second current sensing signal is greater than the current average signal, the controller is configured to operably decrease the second input voltage; and/or
when the second current sensing signal is smaller than the current average signal, the controller is configured to operably increase the second input voltage.

20. The resonant switching power converter of claim 19, wherein the first power stage circuit and the second power stage circuit are configured to operate by alternating phases with each other.

* * * * *